INVENTORS
ELI ANFENGER
BERNARD M. GORDON

BY Joseph Weingarten
ATTORNEY

May 15, 1962 E. ANFENGER ET AL 3,034,719

SIGNAL TRANSLATING SYSTEM

Filed Feb. 12, 1958 10 Sheets-Sheet 2

FIG. 2

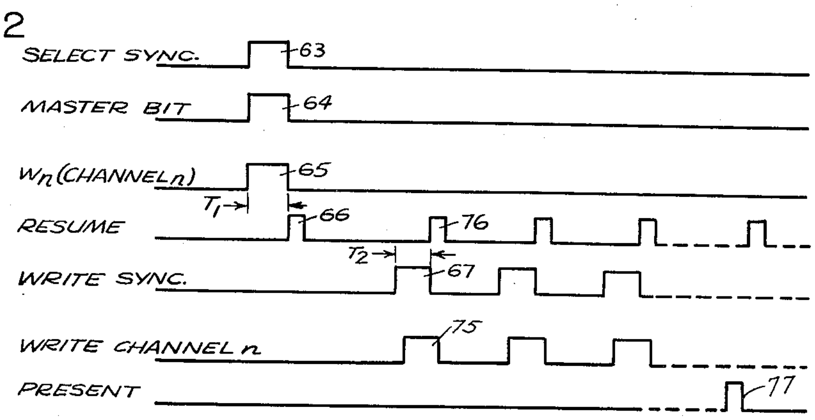

$W_n$ – WRITE COMMAND

RESUME – ACKNOWLEDGEMENT OF COMMAND AND ADVANCES DIGITAL COMPUTER TO NEXT PROGRAM STEP.

WRITE SYNC. – COINCIDENT WITH DATA FROM IOB REGISTER.

PRESENT – PRESENTS SELECTED CHANNELS TO CONVERTER; YIELDS ANALOG VOLTAGE WITHIN THIRTY (30) MICROSEC.

FIG. 3

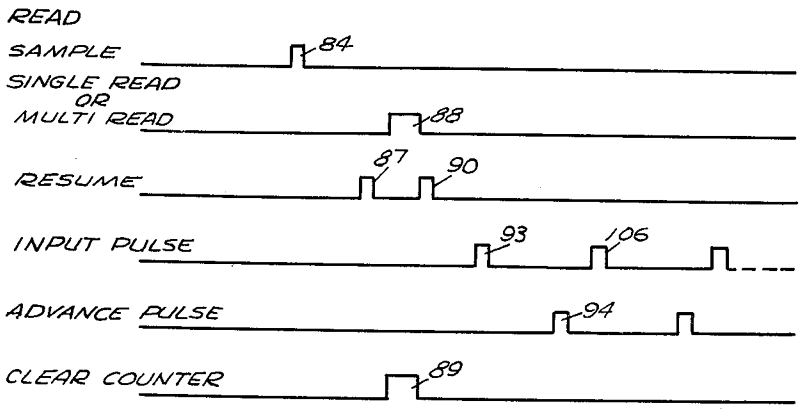

SAMPLE – ALL CHANNELS SAMPLED AND CONVERTED.

SINGLE READ OR MULTI READ – READ COMMANDS.

RESUME – ACKNOWLEDGEMENT OF COMMAND AND ADVANCES DIGITAL COMPUTER TO NEXT PROGRAM STEP.

INPUT PULSE – INDICATES DATA IS IN IOB REGISTER.

ADVANCE PULSE – INDICATES DATA HAS BEEN ENTERED INTO DIGITAL COMPUTER INTERNAL STORAGE.

INVENTORS
ELI ANFENGER
BERNARD M. GORDON

BY Joseph Weingarten
ATTORNEY

INVENTORS
ELI ANFENGER
BERNARD M. GORDON
BY Joseph Weingarten
ATTORNEY

INVENTORS

ELI ANFENGER

BERNARD M. GORDON

BY Joseph Weingarten

ATTORNEY

INVENTORS
ELI ANFENGER
BERNARD M. GORDON
BY Joseph Weingarten
ATTORNEY

INVENTORS
ELI ANFENGER
BERNARD M. GORDON
BY Joseph Weingarten
ATTORNEY

INVENTORS
ELI ANFENGER
BERNARD M. GORDON
BY Joseph Weingarten
ATTORNEY

INVENTORS
ELI ANFENGER
BERNARD M. GORDON
BY Joseph Weingarten
ATTORNEY

INVENTORS
ELI ANFENGER
BERNARD M. GORDON

BY Joseph Weingarten
ATTORNEY

INVENTORS
ELI ANFENGER
BERNARD M. GORDON
BY Joseph Weingarten
ATTORNEY

United States Patent Office 3,034,719

Patented May 15, 1962

3,034,719
SIGNAL TRANSLATING SYSTEM

Eli Anfenger, Brookline, and Bernard M. Gordon, Newton, Mass., assignors to Epsco, Incorporated, Boston, Mass., a corporation of Massachusetts Filed Feb. 12, 1958, Ser. No. 714,879
7 Claims. (Cl. 235—154)

The present invention relates in general to information signal translating apparatus and more particularly concerns a system for exchanging signals between analog and digital computers, thereby enabling the two types of computers to cooperate in solving a given problem. Thus, by taking into consideration such factors as the required accuracy, desired speed, and the form of the input data signals, the appropriate computer may be selected to perform a particular operation most advantageously handled by that computer.

For example, some simulation problems are best handled by analog computers while solutions to others are best obtained with digital computers. Where the problem is not overly complex it is preferable to apply analog techniques because a solution is presented in less time. However, as the complexity of the problem increases, more equipment is added and although the speed of computation remains essentially the same, errors accumulate, causing the solution to be less accurate. Additionally, stability problems are encountered due to additional phase lags introduced by the added equipment.

Although the computer running time is increased, the solution of complex problems may be handled by digital computers without additional equipment by providing the computer with a memory of sufficient capacity. Moreover, nearly any desired degree of accuracy may be obtained by operating with binary words having a sufficiently large number of digits.

Summarily stated, digital computers are preferred where the accuracy required exceeds that obtainable by analog means, sampled data input signals are provided, or the complexity of the problem is such that solution by analog techniques is exceedingly difficult. On the other hand, analog simulation is more desirable where exceptionally high accuracy is not a requisite. Moreover, since almost all physical quantities are related to others by continuous functions, the continuous graphic presentation of the solution by an analog computer is more readily comprehensible than the discrete numerical presentation of a digital computer. Furthermore, where it is desired to connect actual system components, which are analog in nature, into the simulation, it is evident that analog techniques are preferred.

Finally, there is a considerable area of overlap of situations where either digital or analog simulation is satisfactory. Such overlap areas may be used to provide cross-checks between analog and digital simulations and thus insure against errors. This is particularly important in complex simulations because of the error buildup in an analog simulation, the possibility of errors of reasoning or programming in the digital simulation, and the difficulty of detecting errors in a complicated system by physical reasoning alone.

The present invention contemplates and has as a primary object the provision of apparatus for exchanging data signals between digital and analog computers, thereby enabling the computers to cooperate in solving a given problem.

Another object of the invention is to provide for the interchange of analog and digital data signals in accordance with the preceding object under the control of the digital computer.

Still another object of the invention is the rapid exchange of analog and digital data signals between analog and digital computers.

A feature of the invention resides in the provision of a number of digital-to-analog and analog-to-digital conversion channels, and means for selectively activating any one of the channels.

Another feature of the invention resides in activating the conversion channels in sequence, beginning with a selected one of the channels.

An object of the invention is the provision of apparatus for translating analog and digital data signals between analog and digital computers, regardless of the format of the digital computer.

Another object of the invention is the provision of means for adapting the apparatus to provide the desired operation with digital computers having different command structures.

A further object of the invention is the provision of variable repetition rates for generating converted signals to enable selection of the optimum rate consistent with frequency and accuracy requirements of the particular problem and the computation time of the digital computer.

Still a further object of the invention is the provision of data signal conversion apparatus capable of transferring data signals between the computers as fast as the digital computer can handle such transfer.

It is a further object of the invention to minimize dynamic errors by sampling digital data signals and converting the sampled signal to its analog equivalent in an exceptionally short time.

It is an object of the invention to provide conversion apparatus incorporating digital logic in such form that the conversion apparatus is able to accept and interpret signals from the digital computer and supply acceptable signals in return.

It is a further object of the invention to incorporate logic in the apparatus capable of accommodating the fact that the analog computer operates on a rigidly fixed time-scale whereas the digital computer proceeds at a rate dependent on the complexity of the computation without regard to the time-scale of the analog computer or the system being simulated. Ancillary to this object is the prevention of the digital computer from proceeding with the new calculation before the new input data signals have arrived.

It is still another object of the invention to provide conversion apparatus having an analog voltage range the same as the full-scale range of the analog computer, thereby enabling the converter and computer ranges to be used to full advantage.

According to the invention, the novel system for linking the different computers, hereinafter referred to as the computer link, includes terminal equipment for accepting and interpreting digital data signals from the digital computer and supplying acceptable signals in digital form in return. A number of digital-to-analog conversion channels convert digital data signals supplied from the terminal equipment into analog signals for utilization by the analog computer. Reverse translation is effected by a number of analog-to-digital conversion channels for accepting data signals in analog form from the analog computer and providing the corresponding digital data signal to the terminal equipment for transfer to the digital computer. The interchange of data between the two computers is under the control of the digital computer internal program. In response to appropriate control signals from the digital computer, control equipment within the computer link regulates the flow of data signals among the conversion chanels, terminal equipment and computers. The terminal equipment is preferably physically located near the digital computer; the control equipment and conversion channels, near the analog computer. This apparatus may be linked to the terminal equipment by coaxial cables or other suitable means.

In a specific embodiment of the invention, digital data signals are exchanged between the input-output buffer register of the digital computer and the computer link. Encoded instruction signals are coupled from an instruction word register in the digital computer to the computer link. These instructions include the Write instruction, wherein the digital computer writes a data word into the computer link for storage prior to conversion into a corresponding analog signal. An encoded address accompanies the Write instruction for designating the particular digital-to-analog conversion channel into which the first digital data word is to be written. Thereafter, channels are automatically selected in sequence as long as this instruction remains active. A Present instruction directs the computer link to convert the stored digital data into analog form, and transfer the converted data to the analog computer, thus completing a digital-to-analog conversion.

When data is to be transferred in the reverse direction, a Sample instruction directs the conversion apparatus to sample the analog data signal from the analog computer for conversion into the equivalent digital data signal. This instruction is followed by either a Multi Read or Single Read instruction for initiating the transfer of the converted data, now in digital form, to the digital computer input-output register through the terminal equipment of the conversion apparatus. An encoded address accompanies both the latter instructions for designating the first analog-to-digital conversion channel to be read.

In the case of a Single Read instruction, only the designated channel is read. When the Multi Read instruction is active, the channels are read in sequence. During operation with some types of digital computers, means are provided for terminating the sequential reading when the last numbered channel has been read to prevent an extra digital data word from being inserted into the digital computer.

Other features, objects and advantages of the invention will become apparent from the following specification when read in connection with the accompanying drawings in which:

FIG. 2 is a graphical representation as a function of time of command and timing pulses, helpful in understanding the write operation;

FIG. 3 is a similar representation for facilitating an understanding of the read operation;

The detailed description which follows is organized into the divisions and subdivisions:

I. General Description of the System
II. System Operation Generally
III. Detailed System Description
IV. Basic Digital Computer Commands
V. Write Operation
VI. Read Operation
VII. System Components
1. Complementer Control
2. Complementer
3. Stop-Start Controls
4. Read-Write-Resume Controls
5. Auxiliary Pulse Generator
6. Channel Counter
7. Channel Decoder
8. DAC Control
9. Digital-to-Analog Conversion Stage
10. Super Regulated Current Source
11. Sign Bit Sensing Stage
12. Switched Output Amplifier
13. ADC Programmer
14. ADC Comparator
15. Analog-to-Digital Conversion Stage

I. GENERAL DESCRIPTION OF THE SYSTEM

Figure 1:
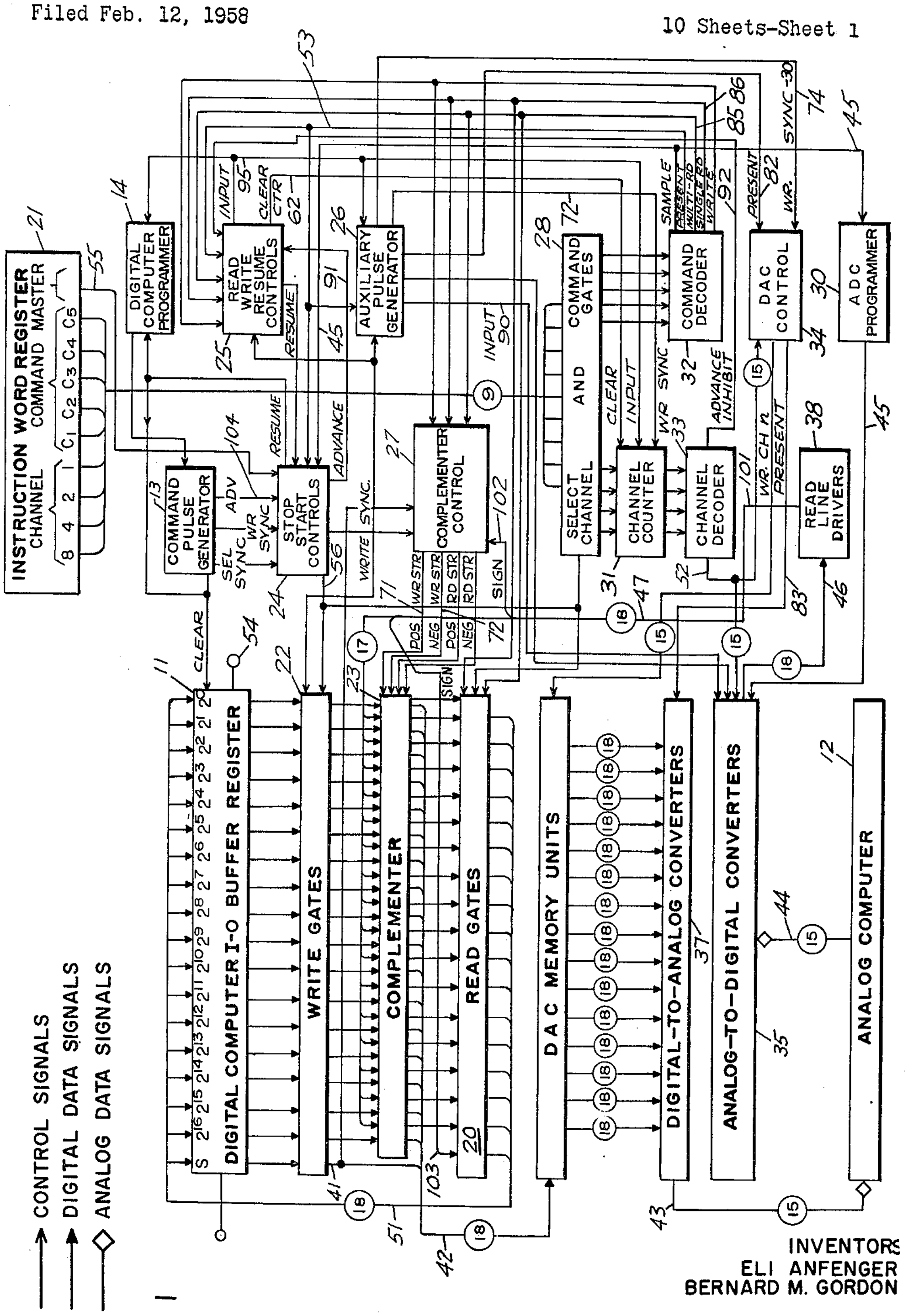
FIG. 1 is a block diagram of the novel computer link cooperating with an analog computer and digital computer to effect the exchange of data signals therebetween.

With reference now to the drawing and more particularly FIG. 1 thereof, there is illustrated a block diagram of the computer link together with the analog computer and pertinent blocks of apparatus within the digital computer. A general description of the system arrangement will facilitate understanding the mode of operation. This exemplary embodiment is described in many respects specifically in association with an early Remington-Rand type 1103 Univac digital computer. Reference to specific apparatus is by way of example only and is not to be construed as limiting the scope of the invention.

The computer link exchanges digital data with the digital computer input-output register 11, hereinafter referred to as the IOB register, and exchanges analog data signals with analog computer 12. Command pulse generator 13, digital computer programmer 14 and instruction word register 21 are components within the digital computer. The remaining apparatus comprises the computer link. The Write gates 22, complementer 23, and read gates 20 are included in the terminal equipment. Stop-start controls 24, read-write-resume controls 25, auxiliary pulse generator 26, complementer control 27, select channel and command gates 28, channel counter 31, command decoder 32, channel decoder 33, DAC controls 34 and ADC programmer 30 are included in the common control equipment of the computer link. Analog-to-digital converters 35 include fifteen individually selectable conversion channels. The DAC controls 34, DAC memory units 36 and the digital-to-analog converters 37 form the digital-to-analog conversion channels, there being an individual 18-bit memory unit for each channel.

II. SYSTEM OPERATION GENERALLY

Briefly, operation is as follows: Conversion is initiated when an appropriate instruction word from the digital computer program resides within the instruction word register 21. For example, this word may contain the Write instruction designating that digital data in IOB register 11 be transferred to channel 7 for conversion into a corresponding analog data signal. This instruction is followed in response to appropriate signals under the direction of digital computer programmer 14. Command pulse generator 13 first generates a Select Sync pulse while stop-start controls 24 are simultaneously activated upon sensing the presence of the Master Bit in instruction word register 21, thus indicating that IOB register 11 is for the exclusive use of the conversion apparatus. The select channel and command gates 28 are appropriately activated and the address of the selected channel, in this example, channel 7 inserted into channel counter 31 as 7 binarily encoded, or 111. This number is decoded by channel decoder 33 which provides a signal for activating channel 7. Command decoder 32 decodes the command and generates a Write command pulse for activating read-write resume controls 25. Digital data signals for conversion are accompanied by a Write Sync pulse from command pulse generator 13. This pulse is applied to stop-start controls 24 and regenerated to activate the write gates 22, the complementer 23 and the DAC memory units 36, the digital data signals passing through the preceding units in that order.

Complementer 23 provides as an output the complement of the absolute value of a negative number and the absolute value of a positive number when the cooperating digital computer retains the value of negative numbers in complementary form. Complementer control 27 senses the sign bit in the entering digital data signal, effecting complementation only if the sign bit indicates the accompanying binary number is negative.

Generally, a Present command follows a Write command. DAC control 34 responds to a Present command pulse by causing the conversion of digital data stored in DAC memory units 36 into analog form by converters 37 and transfer of the converted data to analog computer 12.

For a read operation wherein analog data signals are converted into digital form, command decoder 32 first senses a Sample command to generate a Sample command pulse. ADC programmer 30 responds to this pulse by activating the analog-to-digital converters 35 so that all channels are sampled simultaneously and each sampled analog data signal is converted into an equivalent binary number. A Resume pulse is then applied to programmer 14 for selecting the next step in the digital computer program. Normally, this results in a Read or Multi Read command and an accompanying channel address entering instruction word register 21. The designated channel in analog-to-digital converters 35 transfers the converted data, now in digital form, through read line drivers 38, complementer 23 and read gates 20 into digital computer IOB register 11.

III. DETAILED SYSTEM DESCRIPTION

The preceding general description of the mode of operation and system arrangement facilitates understanding the following discussion which describes in detail the mode of operation and the interconnections between the various blocks of apparatus. As indicated above, digital data words enter and leave the digital computer through IOB register 11. This register accommodates a 17-digit binary number plus the sign bit, designated S. The particular form which this register takes is not a part of the invention and may, for example, comprise a conventional vacuum tube or magnetic core shift register. For each binary digit or bit in buffer register 11, there is an output line coupled to a respective input of write gates 22. The same number of output lines emanate from the latter; however, only the seventeen lines corresponding to the digits of the transferred binary number are applied to respective inputs of complementer 23. The sign bit on line 41 is coupled to an input of complementer control 27 and directly to DAC memory units 36. The seventeen output lines from complementer 23 and the sign bit line 41 form cable 42. This cable transfers the sign bit and output digital data signals from complementer 23, derived in response to the output signals from write gates 22, to the input of DAC memory units 36. For each channel, there is a DAC memory unit and an output cable of eighteen lines coupling each memory unit to a respective one of the digital-to-analog converters 37. The analog output signals from digital-to-analog converters 37 is coupled to analog computer 12 by output lines 43.

Output signals in analog form from analog computer 12 are coupled to analog-to-digital converters 35 by lines 44. When the latter converters are activated by a Sample pulse from command decoder 32 on line 45, all the analog data signals are simultaneously sampled and the magnitude and polarity of each signal encoded in digital form as a binary number with a polarity indicating sign bit.

In response to a following Read pulse, the digital data in only a selected channel is transferred over the eighteen output lines 46 through read line drivers 38 to the eighteen output lines 47. The sign bit is applied to complementer control 27 and to the input of read gates 20. The seventeen digit bearing lines are coupled to the input of complementer 23 which responds to the digital input signal and control signals from complementer control 27 to provide a digital output signal on the output lines connected to the input of read gates 20. The digital data signals at the output of read gates 20 are transferred over cable 51 to the input lines of IOB register 11.

As indicated above, the flow of data between the analog and digital computers is initiated when an appropriate instruction word is inserted into the instruction word register 21 of the digital computer. The portion of this register pertinent to the operation of the conversion apparatus accommodates ten binary bits, there being a corresponding number of output lines as illustrated. The first four are bracketed and bear a four-digit binary number signal bearing the address of the selected channel as the binarily encoded decimal number of the channel. The next five output lines braced in the drawing are designated the command lines and bear a binarily encoded signal indicative of the particular command the conversion apparatus is to follow. The last line bears the master bit. When this line is activated, signifying the presence of a binary One, the computer is indicating its readiness to exchange digital data with the computer link. Stop-start controls 24 include means for regenerating the Master Bit pulse for application to the select channel and command gates 28. The first four output lines from the latter gates are applied to channel counter 31 to set the count therein to a value which corresponds to the number of the selected channel. The remaining five output lines are applied to command decoder 32 which activates that one of the labeled output lines corresponding to the decoded command. Channel decoder 33 senses the count in channel counter 31 to activate one of its fifteen output lines in output cable 52, thereby selecting the appropriate conversion channel. The lines in output cable 52 are coupled to the inputs of both analog-to-digital converters 35 and DAC control units 34. Channel counter 31 is advanced by a Write Sync pulse from auxiliary pulse generator 26 or an Input pulse from read-write-resume controls 25 and cleared by a Clear Counter pulse from the latter controls.

The Present pulse from command decoder 32 is transferred over line 53 to stop-start controls 24, read-write-resume controls 25 and auxiliary pulse generator 26, the latter pulse generator supplying a regenerated Present pulse to DAC control 34. The Input pulse from read-write-resume controls 25 is also applied to digital computer programmer 14 to indicate the presence of converted data in digital form in IOB register 11. In response to the Input pulse, Clear pulses from command pulse generator 13 are applied to IOB register 11 to effect the transfer of the converted data now in digital form, to output terminal 54 for use within the digital computer.

A Resume pulse from read-write-resume controls 25 is coupled through stop-start controls 24 to digital computer programmer 14 for acknowledging a command and initiating the next step in the computer program. Control signals from programmer 14 are applied to command pulse generator 13 which responds by generating Select Sync pulses, Write Sync pulses, or Advance pulses. A Select Sync pulse accompanies the transfer of all command data from the digital computer to apparatus external to the digital computer. A Write Sync pulse accompanies the transfer of a binary number from the IOB register 11. An Advance pulse indicates that the converted data signal in digital form supplied on terminal 54 was received by the internal storage system of the digital computer.

IV. BASIC DIGITAL COMPUTER COMMANDS

For a full understanding of the system, it is helpful to consider the sequence of events which occur in typical operational cycles. A specific example is better understood by first considering the five basic commands supplied from the digital computer for activating the operation of the conversion apparatus. These are:

Write, Start with channel *n*
Present
Sample
Multi Read, Start with channel *n*
Single Read, channel *n*

Before these commands are sent to the computer link, the IOB register 11 is activated to exchange digital data signals with equipment external to the digital computer, and the computer link is exclusively selected as the external equipment for such exchange. All command signals to any equipment external to the digital computer are accompanied by a Select Sync pulse while all digital data signals transferred therefrom in accordance with the Write command are accompanied by Write Sync pulses. Additionally, the digital computer selectively activates the computer link for the exchange of data signals therewith by generating a Master Bit on line 55. The Master Bit is regenerated in stop-start controls 24 and coupled over output line 56 to activate terminal equipment of the computer link.

Although a Select Sync pulse is generated when a command data signal is transferred to the computer link from instruction word register 21, a Master Bit pulse, generated at the same time, activates the select channel and command gates 28. The input lines to these gates include five carrying the command encoded in binary form, and four transferring the binarily encoded number of the selected channel.

The Write Sync pulses activate lines within the computer link for transferring digital data words thereto from the IOB register 11. The Select Sync pulses cause the select channel and command gates 28 to be disabled in the absence of a Master Bit pulse. This prevents the computer link from responding to commands destined for other equipment external to the digital computer. The digital computer logic is so arranged that Write Sync and Select Sync pulses occur during mutually exclusive time intervals; hence, command signals which activate appropriate control equipment precede the transfer of data signals.

The following table indicates the condition of the ten output lines from instruction word register 21 for the designated command. The digits in the respective commands are arranged in the same order as the lines emanating from register 21. A One indicates that the respective line is activated, the deactivated condition being indicated by the binary digit Zero. Those digit places bearing an X indicate that the respective binary digit value depends upon the number of the channel selected by the particular command.

| | Channel Numbers | | | | Commands | | | | | Master Bit |
|---|---|---|---|---|---|---|---|---|---|---|
| | 8 | 4 | 2 | 1 | $C_1$ | $C_2$ | $C_3$ | $C_4$ | $C_5$ | |
| Write, Start with Channel *n* | X | X | X | X | 0 | 0 | 0 | 0 | 1 | 1 |
| Single Read, Channel *n* | X | X | X | X | 0 | 0 | 0 | 1 | 0 | |
| Multi Read, Start with Channel *n* | X | X | X | X | 0 | 0 | 1 | 0 | 0 | 1 |
| Present | 0 | 0 | 0 | 0 | 0 | 1 | 0 | 0 | 0 | 1 |
| Sample | 0 | 0 | 0 | 0 | 1 | 0 | 0 | 0 | 0 | 1 |

Observe that with but five commands and five command lines available, only one command line at a time is energized. This makes the command decoding function relatively simple and in this exemplary embodiment command decoder 32 consists merely of five through channels with a triggered blocking oscillator in each. However, if it is desired to encode additional commands while still using only five command lines, well known techniques may be used to sense the condition of the five lines and generate an appropriate command pulse. Alternatively, where fewer lines are available, the five commands may be binarily encoded and transmitted over three lines.

V. WRITE OPERATION

With reference to FIG. 2, there is graphically represented as a function of time command and timing pulses in proper sequence for the complete execution of a write operation. In this operation a digital data signal from the digital computer is converted into an analog signal for use by the analog computer.

By referring also to FIG. 1, both the timing and flow of the various pulses will be described in detail. Basically, the function of the Write command is to inform the computer link that the digital computer is ready to transfer digital data signals from the IOB register 11 into the computer link for insertion into the DAC memory units 36 associated with the DAC channels, starting with the channel *n* encoded in the activating instruction word. This command is initiated when the Write line from command decoder 32 is activated. A combination of lines joining channel counter 31 and select channel and command dates 28 is activated to indicate the number of the selected channel. Before channel counter 31 is set to a count corresponding to the channel number in response to the combination activated, it is reset to zero by a Clear Counter pulse on line 62 from read-write-resume controls 25. This occurs in response to the Write pulse applied to read-write-resume controls 25 setting flip-flop therein. A detailed discussion of this operation is contained below in connection with the description of system components.

There is simultaneously generated a Select Sync pulse 63, a Master Bit pulse 64 and a Write command pulse 65. In response to the Write signal on line 61, read-write-resume controls 25 generate a Resume pulse 66 which is coupled to the digital computer programmer 14 through stop-start controls 24, thereby acknowledging receipt of the command from the digital computer and advancing the latter to the next program step. Resume pulse 66 is generated immediately following the time interval $T_1$, the duration of pulses 63, 64 and 65. Meanwhile, channel decoder 33 decodes the count then within channel counter 31 to activate one of the fifteen output lines in output cable 52 with a conditioning potential for readying the corresponding channel in a DAC memory units 36 to accept digital data signals. The Resume pulse 66 is also utilized to clear the IOB register 11 in preparation for the receipt of digital data from the digital computer internal storage system. Thus, register 11 is cleared for the next program step which occurs from 25 to 45 microseconds later, depending on the speed of the associated digital computer. This step is the generation of the Write Sync pulse 67 which lasts for the time interval $T_2$. Prior to this time interval, the digital data word to be converted into analog form is inserted into IOB register 11. It is important to note that should programmer 14 fail to receive a Resume pulse, the digital computer program is halted until such pulse is received. Additionally, the Write pulse on line 61 sets a flip-flop in complementer control 27 for supplying a conditioning potential which later allows the Write Sync pulse and the computer data sign bit to activate apprporiate operation of complementer 23. Thus, at the time Write Sync pulse 67 is generated, the data word is in the IOB register and ready for transmission to the computer link.

A flip-flop in stop-start controls 24 has already been set by the presence of the Master Bit on line 55. The Write Sync pulse cooperates with the conditioning potential supplied by the latter flip-flop in the set condition to operate a blocking oscillator, also in stop-start controls 24, for producing Write Sync pulses for internal use within the computer link. The Write Sync pulse thus generated is applied to complementer control 27 where it is delayed for two microseconds and in combination with a conditioning potential from a flip-flop, set earlier by the Write pulse, and the sign bit from line 41 of the computer digital data word ready for conversion, pulses a blocking oscillator therein to produce a Positive Write Strobe or Negative Write Strobe on output lines 71 and 72, respectively, in response to the bit being Zero and One respectively, indicating that the binary number to be converted is positive and negative, respectively. The latter strobe pulses applied to complementer 23 combine with the proper data bit signals from the IOB register 11 transmitted through write gates 22 to process the 18 data bit lines for writing into the appropriate DAC memory unit channel. At this time, the 18 data lines in cable 42 are active and the digital data thereon is in absolute value code form, compatible with the digital-to-analog converters 37 within the computer link.

The Write Sync pulse is also applied to auxiliary pulse generator 26 for pulsing a blocking oscillator therein which provides a pair of Write Sync pulses at potentials of ground and minus 30 volts, respectively. The Write Sync pulse at ground potential is applied to channel counter 31 over line 72 and delayed therein ten microseconds, long enough for a digital data word to be completely written into that unit of DAC memory units 36 associated with the selected channel. At the end of this delay period, the delayed pulse advances the count in channel counter 31 by one, so that a subsequent data transfer, if sent from the digital computer, will be entered into channel $n+1$. The channel counter sequence is arranged such that channel 1 follows channel 15 in the counter sequence; that is to say, a count of zero is bypassed. The means by which this is accomplished is described below.

In a preferred embodiment of the invention, the DAC memory units 36 comprise a magnetic core storage system arranged in the form of a matrix with as many rows of cores as there are binary bits in a digital data word and as many core columns as there are channels. In this specific example, there are eighteen rows and fifteen columns. As indicated above, an appropriate channel line in output cable 52 from channel decoder 33 is activated. Meanwhile, DAC controls 34 respond to the Write Sync pulse at $-30$ volts coupled from auxiliary pulse generator 26 on line 74 and the activated channel $n$ line in output cable 52 by generating a corresponding Write Channel $n$ pulse 75. The actual transfer of data into the appropriate DAC memory unit now takes place as the active data lines energize the bit lines, each bit line being common to all the magnetic cores in a row. The digital data signal on output cable 42 from complementer 23 is accordingly entered into the appropriate DAC memory unit. At this time, the Write function is complete and the Write Sync pulse from stop-start controls 24 is applied to read-write resume controls 25. The read-write resume controls respond by generating a Resume pulse 76 for application to digital computer programmer 14 to initiate the next step in the computer program. If it is desired to effect the conversion of additional digital data words, the next step in the computer program will be a repeat of the operations just described in connection with the generation of Write Sync pulse 67, Write Channel $n$ pulse 75 and Resume pulse 76. In FIG. 2, such a program is represented by the sequence of pulses following the aforesaid numerically identified pulses. Once the writing operation is complete, the next step in the program is normally initiated with the generation of a Present pulse 77.

After the Write command has effected the entry of digital data from the digital computer into the appropriate DAC memory unit, a Present command causes data held in storage to be transferred into the corresponding digital-to-analog converter. According to the absolute value of the binary numbers in storage, the flip-flops associated with a respective digital-to-analog converter selectively provide a new voltage output for a selected channel $n$ which may then be utilized in the analog computer 12. In the preferred embodiment of the invention, the circuitry is so arranged that only those digital-to-analog converters are activated for which there is new data in the associated memory unit. All others continue to present the analog equivalent of the digital number most recently stored.

Present pulse 77 occurs in time after the data from the digital computer is inserted into DAC memory units 36. This pulse is applied on line 53 to read-write resume controls 25 which respond by generating a Resume pulse 81 for coupling to digital computer programmer 14 to prepare the digital computer for the next program step. The Present pulse 77 on line 53 is regenerated by auxiliary pulse generator 26 where a blocking oscillator reproduces the pulse for application on line 82 to DAC controls 34. A blocking oscillator in DAC controls 34 is triggered to further regenerate the Present pulse on line 83, thereby activating the digital-to-analog converters 37 and providing the newly converted signal, now in analog form, on the appropriate one of lines 43 for utilization by analog computer 12.

VI. READ OPERATION

Having discussed the system operation for translating digital data signals from the digital computer into analog signals for use by the analog computer, it is appropriate to consider the mode of operation by which the reverse translation occurs. The discussion which follows concerning the read operation will refer to FIGS. 1 and 3, the latter presenting a graphical representation of the designated control pulses as a function of time to clarify the sequence of events which occur during the read process. The process of reading involves taking converted data from the analog-to-digital converters 35 and entering this data into the digital computer. This is accomplished by generating a Sample command, followed by a Read command. In response to the Sample command pulse, the analog data signals on all the lines 44 from analog computer 12 are simultaneously converted by analog-to-digital converters 35 into a digital static code in each channel. In FIG. 1, the Sample command is represented as being initiated by the digital computer; however, means are also provided to permit this command to be selected manually or by an external source. The Sample command is transmitted from instruction word register 21 through the select channel and command gates 28 and sensed by command decoder 32 which provides a Sample pulse 84 on line 45. This pulse is applied to ADC programmer 30, causing analog-to-digital converters 35 to sample and convert the analog data signals on lines 44. It is also applied to stop-start controls 24 where it is delayed and utilized to generate a Resume pulse 87 which is sent back to digital computer programmer 14 to prepare the computer for the next program step. This pulse also clears IOB register 11 to ready it for acceptance of converted data, then in digital form. The computer link is now prepared to respond to a Read command for effecting the transfer of converted data in digital form to the digital computer IOB register 11. The Multi Read and Single Read commands are essentially the same in their effect upon the computer link, the difference being that the former causes data to be read from channels *n* through 15, but not further, in the analog-to-digital converters 35, while the latter allows only the single designated channel to be read. This will be explained in greater detail below.

In the same manner as the Write command discussed previously the Multi Read command resides within the digital computer instruction word register 21 with a Master Bit. In response to a Master Bit pulse, the encoded Multi Read command is transferred through the select channel and command gates, the Multi Read pulse being generated on output line 85 of command decoder 32. Similarly, in response to the appropriate command, a Single Read pulse is generated by command decoder 32 on output line 86. The Read and Multi Read pulses are transmitted over parallel channels, both activating read gates 20, energizing complementer control 27 and read-write resume controls 25. They, in fact, perform parallel functions with the exception that a flip-flop in the latter controls, when reset to the single read position, prevents an Advance pulse, discussed below, from immediately generating an Input pulse. The purpose of the Input pulse is to inform the digital computer of the presence of a converted data signal, now in digital form, in IOB register 11. Read command pulse 88 is applied to complementer control 27 and, after a delay, combined therein with Input pulse 93 to produce at the output thereof a Read Positive Strobe or a Read Negative Strobe for application to complementer 23 on the designated lines to complement or not complement, respectively, the read-out digital data before sending it on to the digital computer. Read pulse 88 is also applied to read-write-resume controls 25 where it sets a flip-flop therein, as discussed above. When lines 91 and 92 are simultaneously activated with an Advance pulse and Advance Inhibit Conditioning potential, respectively, the latter controls generate Input pulse 93. An Advance pulse 94 is generated by command pulse generator 13 in response to the entering of converted digital data supplied from the computer link into the digital computer internal storage. Line 92 with the Advance Inhibit conditioning potential thereon is normally activated except when channel decoder 33 senses a count of one in channel counter 31. With this arangement, the last channel to be read is channel fifteen. When either line 91 or 92 is not activated, as is the case when Read pulse 88 is generated, an Input pulse is not immediately generated, but is derived by delaying the latter Read pulse approximately 17 microseconds. In response to the Read pulse 88, read-write-resume controls 25 also generate a Clear Counter pulse 89 on output line 62 for setting channel counter 31 to zero, and a Resume pulse 90 which clears IOB register 11 and is applied to digital computer programmer 14 to initiate the next step in the program. After being set to zero, the channel counter 31 is set with the count of the selected channel in a manner described in detail below.

Input pulse 93 on line 95 is applied to channel counter 31 to step the count contained therein by one, and to auxiliary pulse generator 26 where it is reproduced at a —30 volt level on line 90 for strobing the selected analog-to-digital conversion channel 35 by producing a Read Channel *n* pulse, local to a selected channel determined by the appropriate activated output line from channel decoder output cable 52. This pulse causes data flow from the analog-to-digital converters 35 over a signal path including read line drivers 38, output line 46, complementer 23, and output cable 101, with the sign bit applied to complementer control 27 over line 102, and to the output cable 51 from read gates 24 over line 103. At this time there are nineteen active lines, eighteen digital data lines and line 95 with the Input pulse thereon. The digital data signals have been operated upon in complementer 23 so that the digital data transmitted over output cable 51 from read gates 24 is in a form compatible with that employed by the digital computer and now resides in IOB register 11, the computer being aware of the presence of this data as a result of digital computer programmer 14 being energized with the Input pulse.

The computer link holds, awaiting the next command from the digital computer. In the case of a Multi Read operation, this is Advance pulse 94. The Advance pulse is coupled from command pulse generator 13 over line 104 and applied to stop-start controls 24 where it is reproduced by a blocking oscillator therein for use within the computer link. The reproduced pulse is coupled over line 91 to read-write-resume controls 25 where, as indicated above, in the presence of the Advance Inhibit conditioning potential and a set signal from the Multi Read flip-flop, Input pulse 106 is produced.

As indicated above, the Advance Inhibit conditioning potential is not present on line 92 from channel decoder 52 when channel counter 31 has a count of one, thus preventing the generation of an Input pulse in response to an Advance pulse. As earlier noted, however, after a delay of approximately 17 microseconds an Input pulse 93 is generated in response to the Read pulse 87. As a result, the first word is read by the digital computer without generating an Advance pulse therefrom. Therefore, the possibility would exist of an extra data word being trapped in IOB register 11 of the first few type 1103 digital computers produced which do not have provision for always clearing the IOB register before taking the next step in the program. This is prevented by inhibiting the Advance pulse in a manner which prevents the channel counter 31 from selecting a channel beyond 15. The counter circuitry is so arranged that selection of channel 1 directly follows selection of channel 15; that is, a count of zero is skipped. Thus, after channel 15 has been read and the counter stepped to one, Advance Inhibit line 92, is deactivated and the Advance pulse from the digital computer cannot cause any further data to be read from the computer link until another Read command pulse is generated. For compatible operation with other large scale digital computers, such as the IBM 704, which does not initiate a read operation with the same command structure, means are provided for maintaining line 92 at all times activated and continuous sequential reading of the channels may be obtained.

VII. SYSTEM COMPONENTS

Having described in detail the mode of operation of the system, certain blocks of apparatus illustrated generally in FIG. 1 will be shown and described more specifically. While those skilled in the art may realize the various blocks of apparatus in numerous well-known forms, apparatus arranged as described below exhibits certain advantages and features which will become evident from the following discussion.

As indicated above, the computer link includes terminal equipment for performing three functions; namely, accepting digital data and commands from the digital computer and relaying them to the control and conversion equipment, sending converted analog data in digital form back to the digital computer, and serving as a decoding device by utilizing complementer 23. The first two functions were adequately described above in connection with the detailed description of the system mode of operation. Accordingly, only the decoding function of the terminal equipment will now be considered by describing in detail an exemplary embodiment of the complementer 23 circuitry.

1. *Complementer Control*

The Remington Rand type 1103 digital computer and the computer link employ different digital codes. Therefore, digital data in one is not directly compatible with digital data in the other. This computer represents a negative number by preceding the complement of the magnitude of such number with a sign bit of One while representing positive numbers by the magnitude thereof preceded by the binary bit Zero. In the computer link, however, both positive and negative numbers are designated by their absolute value preceded by an appropriate sign bit, One and Zero for negative and positive numbers respectively. For example, consider a four-bit binary representation of a decimal number in which the first digit is the sign bit. If the decimal number were +5, both the Univac computer and the computer link would encode this as 0101. However, the decimal number —5 would be encoded 1101 by the computer link and 1010 by the Univac. The two codes are made compatible by complementing or not complementing the absolute value of the encoded number in response to the sign bit accompanying the number. Since positive numbers remain the same, they are not complemented while negative numbers must have their Zeros replaced with Ones and vice versa, with the exception of the sign bit, which is not complemented. It will be recalled that in the apparatus of FIG. 1, both sign bit lines bypassed complementer 23, thereby preventing the sign bits from ever being complemented.

Figure 4:
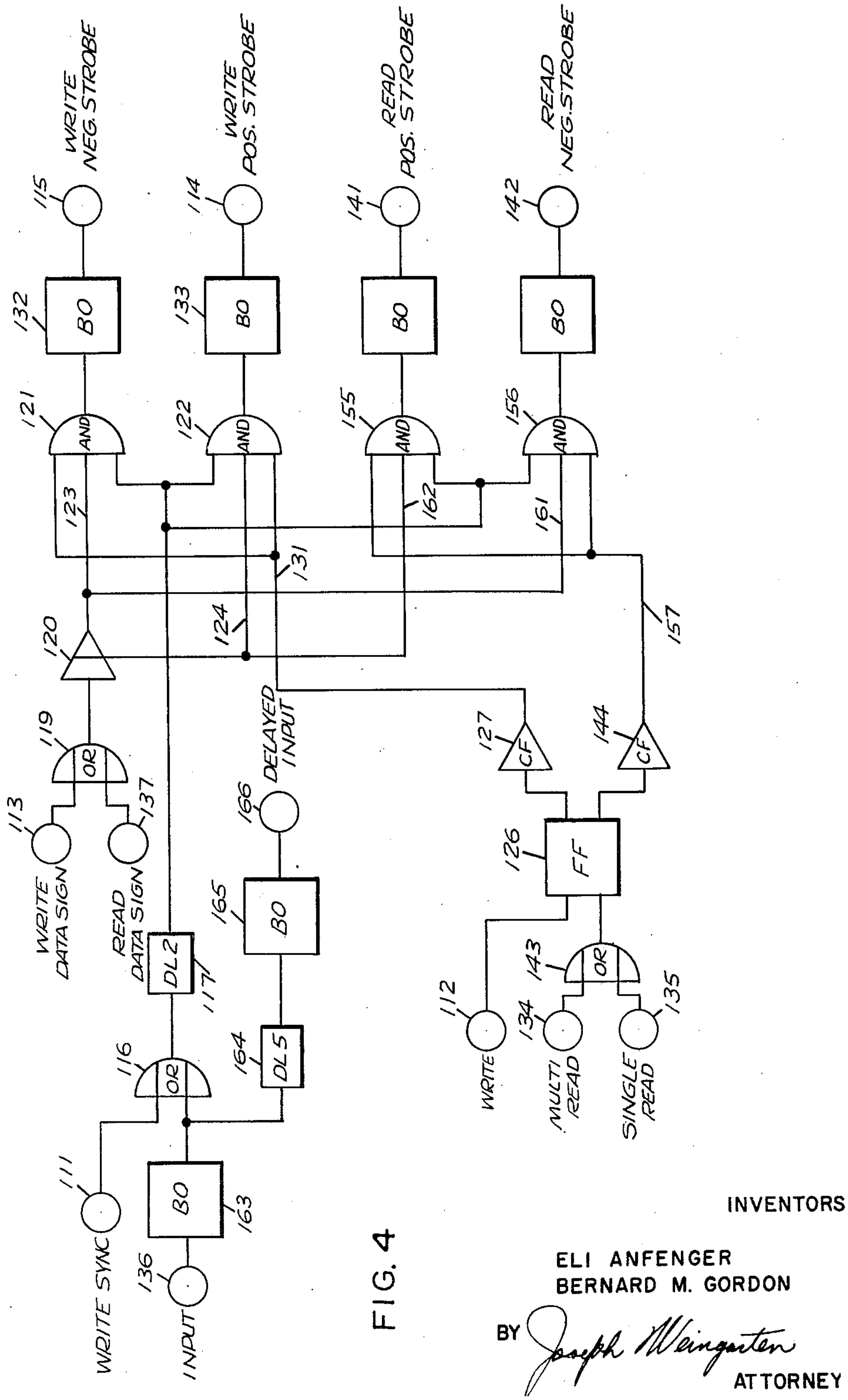
FIG. 4 is a block diagram of the complementer control.

With reference to FIG. 4, there is illustrated a block diagram of complementer control 24. In this and subsequent block diagrams, flip-flops are designated by the letters FF, delay lines by the letters DL and an appended numeral indicative of the imparted delay in microseconds, blocking oscillators by the letters BO, cathode followers by the letters CF and monostable multivibrators, for imparting a selected delay, by DF with a numeral appended indicative of the delay imparted. Buffers, or OR gates, are represented by an area defined by an arc and the chord defining the extremities thereof, with input lines extending through the chord to join the arc. A gate, or AND gate, is represented by a similarly bound area with the input lines extending only to the chord.

During a Write operation, the complementer control 27 responds to a Write Sync pulse on terminal 111, a Write command pulse on terminal 112, and a Write Data Sign Bit pulse on terminal 113 to provide a Write Positive Strobe pulse on terminal 114, if the binary number to be transferred is positive, or a Write Negative Strobe pulse on terminal 115 if the binary number is negative, effecting non-complementation and complementation, respectively, by complementer 23. This is accomplished in the following manner: The Write Sync pulse is coupled through buffer 116. After being delayed two microseconds by delay line 117, this pulse is applied in parallel to gates 121 and 122. If the Write Data Sign Bit is a One, signifying that the binary number is negative, a potential appears on terminal 113 which is coupled through buffer 119 and amplifier 120, raising line 123 to gate 121 while lowering line 124 connected to gate 122.

Meanwhile, a Write pulse on terminal 112 has set flip-flop 126 which provides a conditioning potential through cathode follower 127 to condition line 131 of gates 121 and 122. With line 124 low and 123 high, gate 122 is unable to pass the delayed pulse from delay line 117 while this pulse is passed by gate 121 to trigger blocking oscillator 132 and provide the Write Negative Strobe pulse on terminal 115. When the Write Data Sign Bit is Zero, signifying a positive number, the potential on terminal 113 is low and line 123 is low while line 124 is high, thereby reversing the conditions of gates 121 and 122. As a result, the delayed pulse from delay line 117 is passed by gate 122 to trigger blocking oscillator 133 and provide the Write Positive Strobe pulse on termial 114.

During the read operation, complementer control 27 responds to either a Multi Read or Single Read command pulse, an Input pulse, and the Read Data Sign Bit signal respectively on terminals 134, 135, 136 and 137 to provide a Read Positive Strobe pulse on terminal 141 when the binary number to be read out is positive, and a Read Negative Strobe pulse on terminal 142, when such number is negative, to effect non-complementation and complementation, respectively, by complementer 23. This is accomplished as follows: The appropriate Read command pulse is coupled through buffer 143 to reset flip-flop 126 and supply a conditioning potential through cathode follower 144 to gates 155 and 156, respectively, on line 157. When the Read Data Sign Bit is a One, signifying an accompanying negative binary number, the potential on terminal 137 is high and is transmitted through buffer 119 to amplifier 120 to raise line 161 while lowering line 162. Thus, only gate 156 can pass the delayed pulse from the output of delay line 117 in response to blocking oscillator 163 being triggered by the Input pulse on terminal 136 to provide an output pulse coupled through buffer 116 to delay line 117. The pulse from blocking oscillator 163 is also applied to delay line 164, the delayed output pulse therefrom triggering blocking oscillator 165 to generate a delayed Input pulse on terminal 166 to inform the digital computer of the availability of a digital data signal translated from an analog input signal by the computer link. The delay imparted is sufficient to allow the digital computer to settle after receipt of the digital data signal by IOB register 11.

2. *Bit Complementer Stage*

Figure 5:
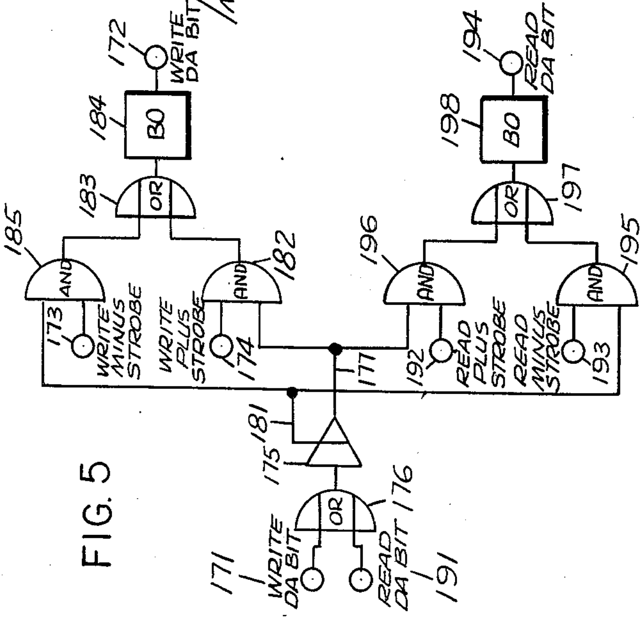
FIG. 5 is a block diagram of a bit complementer stage.

A suitable circuit which may be employed in complementer 23 for responding to the data bit pulses and Strobe pulses from complementer control 27 is shown in block diagram form in FIG. 5. Since like circuits are used to complement each bit, only the circuit for complementing a single bit will be considered. A Write Data Bit conditioning potential on terminal 171, is converted into an appropriately complemented or non-complemented Write Data Bit potential on terminal 172 in response to a Write Minus Strobe pulse on terminal 173 or Write Plus Strobe pulse on terminal 174, respectively. When the Data Bit potential on terminal 171 represents binary One, the latter terminal is raised and this rise is coupled to amplifier 175 through buffer 176, thereby raising line 177 and lowering line 181. Accordingly, gate 182 is conditioned to pass a Write Plus Strobe pulse through buffer 183 to trigger blocking oscillator 184 which provides a pulse on output terminal 172 representative of a binary One, the uncomplemented input bit. However, gate 185 cannot pass the Write Minus Strobe, if applied on terminal 173, and so blocking oscillator 184 would not be triggered. Thus, the absence of a pulse on terminal 172 signifies the presence of a binary Zero thereon, the complement of the bit at input terminal 171.

If instead, the Write Data Bit is Zero, terminal 171 is low and line 181 is high while line 177 is low. Accordingly, gates 185 and 182 are respectively conditioned and not conditioned to pass the Strobe pulse, if applied, to the respective input terminals 173 and 174. A Write Minus Strobe pulse applied to gate 185 is then coupled through buffer 183 to trigger blocking oscillator 184 and provide an output pulse on terminal 172 indicative of binary One, the complement of the bit on terminal 171 while a Write Plus Strobe on terminal 174 is not passed by gate 182 and no pulse appears on terminal 172, indicating binary Zero the uncomplemented version of the input bit on terminal 171.

Operation is essentially the same when Read Data bit potentials are applied to terminal 191 with either a Read Plus Strobe pulse on terminal 192 or Read Minus Strobe pulse on terminal 193 effective in providing the appropriate complemented or uncomplemented Read Data Bit on terminal 194. Functionally, gates 195 and 196 correspond respectively to gates 185 and 182; buffer 197, to buffer 183; and blocking oscillator 198, to blocking oscillator 184.

3. *Stop-Start Controls*

Figure 6:
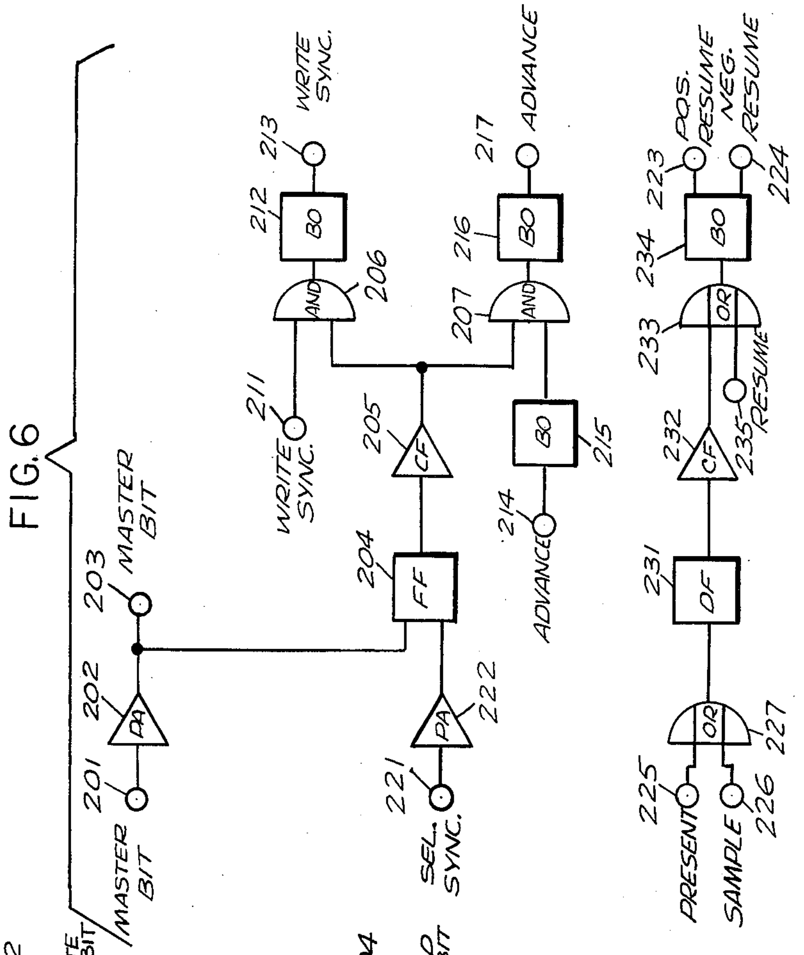
FIG. 6 is a block diagram of the stop-start controls.

Referring to FIG. 6, there is illustrated a block diagram of stop-start controls 24. A Master Bit pulse on terminal 201 is regenerated by pulse amplifier 202 to provide a Master Bit pulse on terminal 203 for use within the computer link and for setting flip-flop 204 to provide a conditioning potential which is coupled through cathode follower 205 to condition gates 206 and 207 for the passage of appropriate pulses. Gate 206 passes a Write Sync pulse applied to terminal 211 to trigger blocking oscillator 212 and generate a Write Sync pulse on terminal 213 for use within the computer link. An Advance pulse applied to terminal 214 triggers blocking oscillator 215 to provide an output pulse passed by gate 207, when conditioned, for triggering blocking oscillator 216 to provide an Advance pulse on terminal 217 for internal use within the computer link. A Select Sync pulse applied to terminal 221 is amplified by pulse amplifier 222 to reset flip-flop 204 when a Master Bit pulse is not simultaneously present on terminal 201, thereby deactivating gates 206 and 207. As indicated above, the Select Sync is generated whenever commands are transmitted from the digital computer to external equipment. When the Master Bit is present, indicating that such commands are for the conversion equipment, the resetting effect of a Select Sync pulse is overridden; hence, the computer link remains in a condition to accept signals from the digital computer. However, in the absence of a Master Bit, each Select Sync pulse maintains flip-flop 204 reset, thereby rendering the computer link insensitive to data and command signals intended for other external equipment.

A positive-going and negative-going Resume pulse is generated on output terminals 223 and 224, respectively, in response to either a Present or Sample pulse applied on terminals 225 and 226, respectively. Either of the latter pulses is coupled through buffer 227 to delay flip-flop 231 which provides a delayed pulse coupled by cathode follower 232 to buffer 233 to trigger blocking oscillator 234 and thereby provide the Resume pulses on terminals 223 and 224. The latter pulses are also provided in response to a Resume pulse from read-write-resume controls 25 energizing terminal 235.

4. *Read-Write-Resume Controls*

Figures 7, 8:
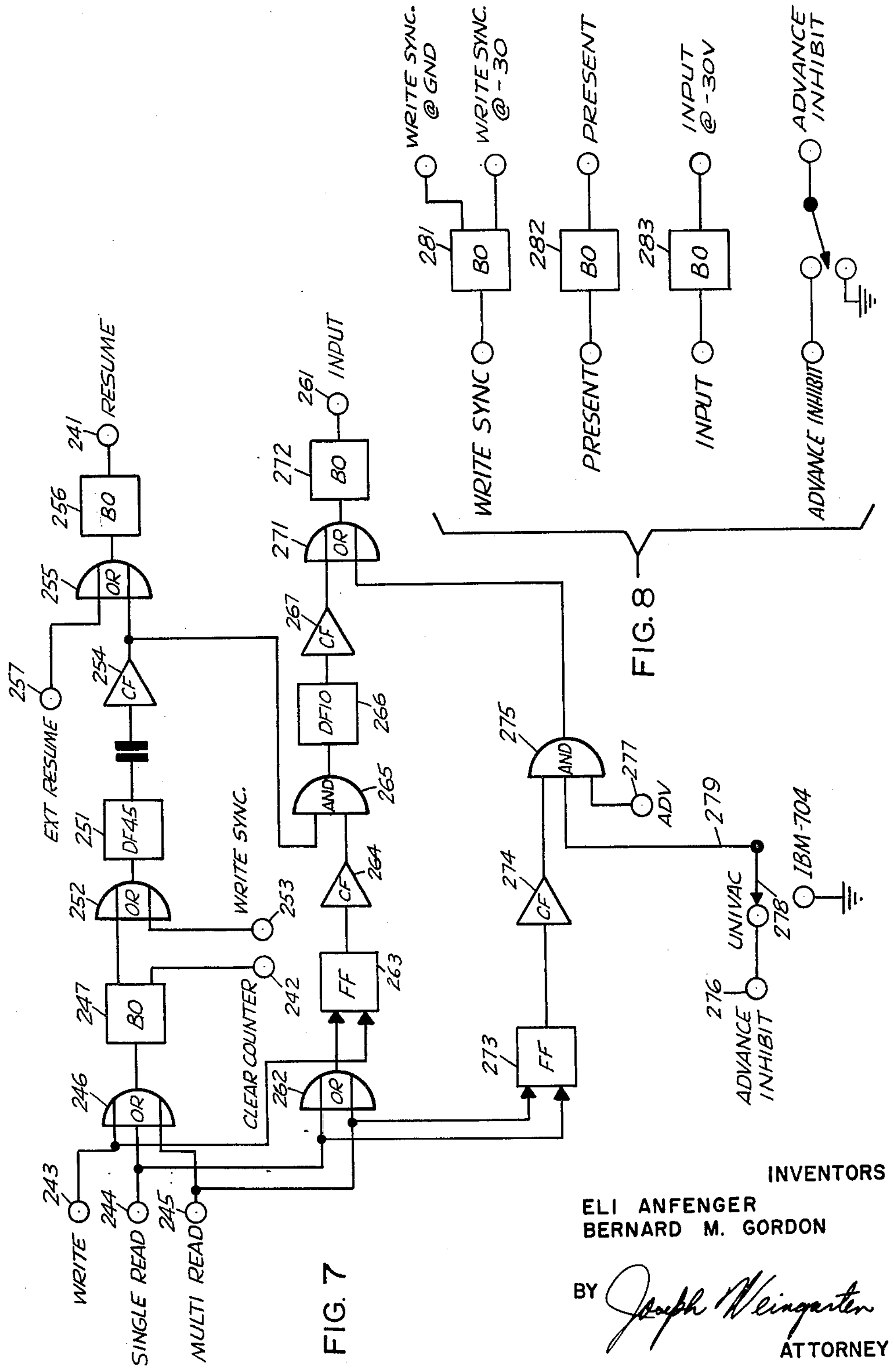
FIG. 7 is a block diagram of the read-write-resume controls.
FIG. 8 is a block diagram of the auxiliary pulse generator.

With reference to FIG. 7, there is illustrated a block diagram of read-write-resume controls 25. A Resume pulse is provided on output terminal 241 and a Clear Counter pulse on terminal 242 in response to a Write, Single Read, or Multi Read command pulse applied on terminals 243, 244 and 245, respectively. The latter pulses are coupled through buffer 246 to trigger blocking oscillator 247 which provides an output pulse applied to delay flip-flop 251 through buffer 252. Buffer 252 is also energized by a Write-Sync pulse applied on terminal 253; hence, a Resume pulse is also generated in response to a Write Sync pulse. Delay flip-flop 251 imparts a 4.5 microsecond delay to an applied pulse and the delayed pulse is coupled through cathode follower 254 and buffer 255 to trigger blocking oscillator 256, thereby generating the Resume pulse on terminal 241. An External Resume pulse applied to terminal 257 is also effective in triggering blocking oscillator 256 when it is desired to effect resumption of the digital computer program from a source external to the computer link.

An Input pulse is generated on terminal 261 in response to the application of a Single Read or Multi Read command pulse on terminals 244 and 245, respectively. The latter pulses are coupled through buffer 262 to set flip-flop 263, the raised potential at the output of the latter flip-flop being coupled to cathode follower 264 to condition gate 265. When gate 265 is conditioned, a delayed pulse from cathode follower 254, generated in response to a Single Read or Multi Read command pulse, is coupled through gate 265 to delay flip-flop 266, which imparts an additional 10 microsecond delay to the pulse. The additionally delayed pulse is coupled through cathode follower 267 and buffer 271 to trigger blocking oscillator 272 and provide the Input pulse on terminal 261. A Write command pulse applied on terminal 243 resets flip-flop 263, thereby deconditioning gate 265 and preventing an Input pulse from being generated during a Write operation.

Flip-flop 273 is set by a Multi Read pulse applied on terminal 245 to provide an output potential which is coupled through cathode follower 274 to condition gate 275. When the Advance Inhibit potential on terminal 276 is also high, gate 275 is conditioned to pass an Advance pulse applied on terminal 277 which is coupled to buffer 271 to trigger blocking oscillator 272 and generate an Input pulse on terminal 261. When a Single Read pulse is applied on terminal 244, flip-flop 273 is reset, thereby deconditioning gate 275 and preventing an Advance pulse from triggering blocking oscillator 272 to provide an Input pulse.

With switch 279 in the Univac position, operation of the apparatus is compatible with that of the early version of the Sperry Rand type 1103 computer and the Advance Inhibit conditioning potential from channel decoder 33 (FIG. 1) helps control the conditioning of gate 275. When switch 278 is switched to the IBM 704 position, the apparatus is compatible for operation with that digital computer or other types which clear the IOB register 11 before each program step and a conditioning potential is then always on line 279, regardless of the count in channel counter 31.

5. *Auxiliary Pulse Generator*

With reference to FIG. 8, there is illustrated a block diagram of auxiliary pulse generator 26. This pulse generator comprises blocking oscillators 281, 282 and 283 responding to the designated input pulses to generate the designated output pulses.

6. *Channel Counter*

Figure 9:
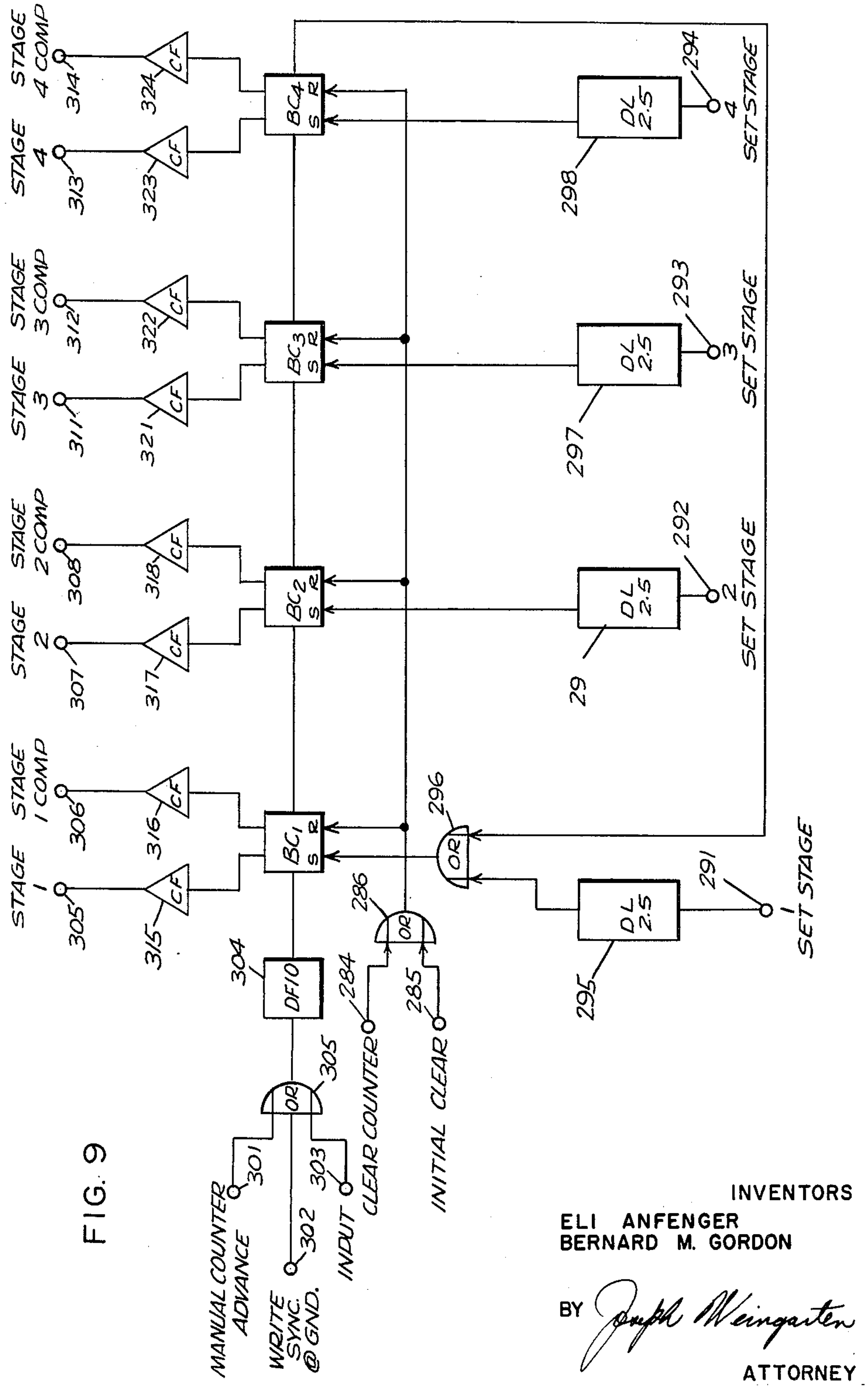
FIG. 9 is a block diagram of the channel counter.

With reference to FIG. 9, there is illustrated a block diagram of channel counter 31. This counter comprises four conventional cascaded binary counter stages, respectively $BC_1$, $BC_2$, $BC_3$ and $BC_4$, with the reset inputs, designated R, of each jointly energized by either a Clear Counter or Initial Clear pulse applied on terminals 284 and 285 respectively and coupled through buffer 286. Each set input, designated S, is coupled to a respective input terminal 291, 292, 293 and 294 through means which include respective delay lines 295, 296, 297 and 298 for imparting a 2.5 microsecond delay to count setting pulses applied to the latter input terminals for setting a count corresponding to the channel selected. When a binary One is represented in the associated digit place of the encoded channel address, a pulse is applied to the corresponding input terminal for setting the associated binary counter stage. The delay line between the set inputs and the input terminals insures that the counter is first set to zero before a channel number is inserted therein.

The set input of binary counter $BC_1$ is coupled to delay line 295 and the output of binary counter stage $BC_4$ through buffer 296. This enables the carry pulse generated at the output of binary counter $BC_4$ to be utilized to set binary counter $BC_1$ after a count of fifteen, to a count of one instead of zero, thereby enabling all the channels to be selected in sequence during a write operation without interruption and regardless of which channel is first selected. It will be recalled that when the channels are read in sequence during a read operation with the Univac digital computer, the Advance Inhibit feature prevents the sequence from extending beyond the last channel.

The counter is advanced by one in response to a Counter Advance pulse applied manually on terminal 301, a Write Sync pulse applied on terminal 302, or an Input pulse applied on terminal 303 coupled to delay flip-flop 304 by buffer 305 whereby each pulse is delayed 10 microseconds before advancing the counter. Eight output potentials are derived from the counter to provide a positive indication of the binary digit and its complement represented by the condition of each stage. Each of these output terminals, 305, 306, 307, 308, 311, 312, 313 and 314 are coupled to an appropriate output of the associated counter stage by cathode followers 315, 316, 317, 318, 321, 322, 323 and 324, respectively.

7. *Channel Decoder*

Figure 10:
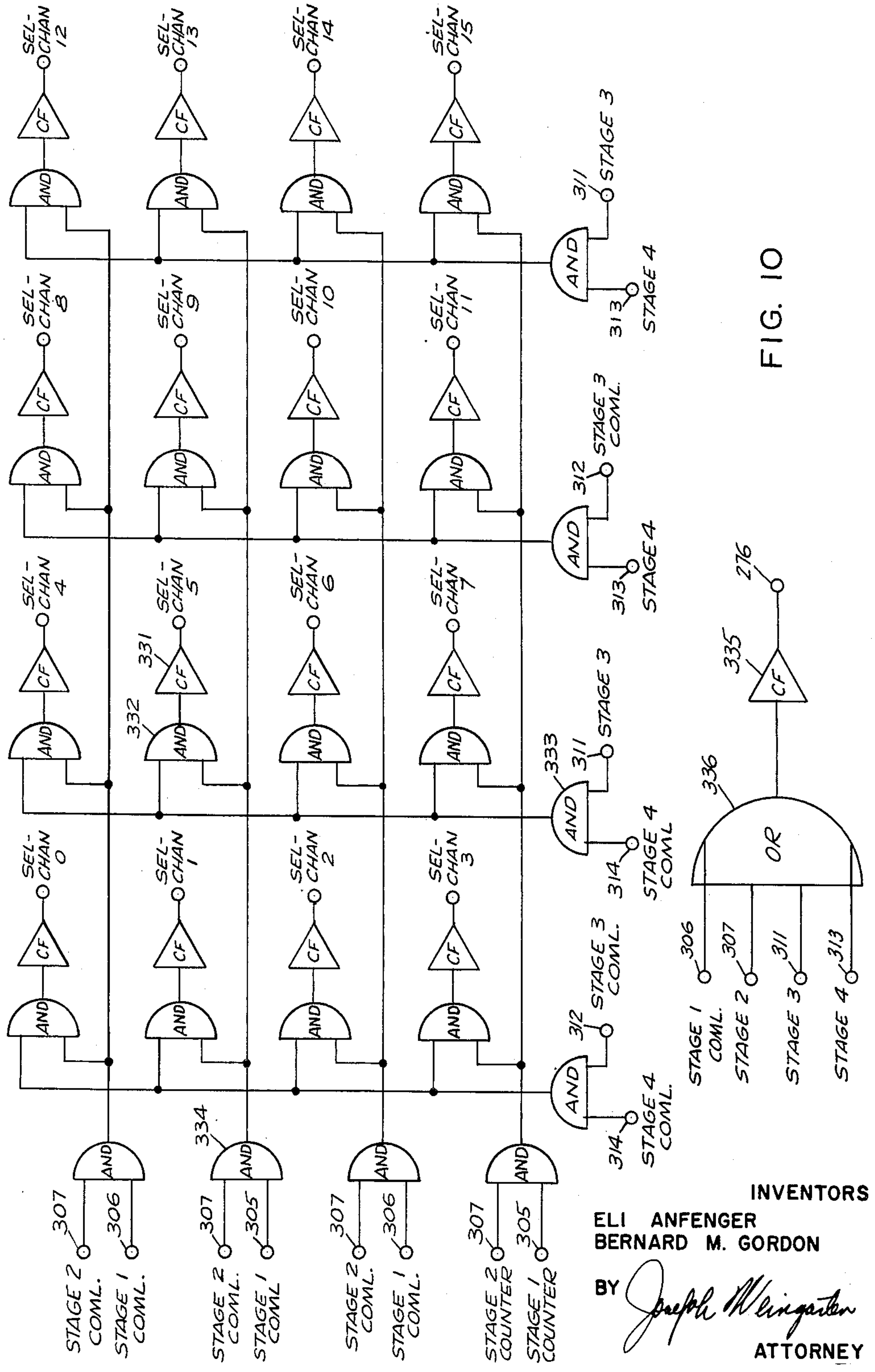
FIG. 10 is a block diagram of the channel decoder.

With reference to FIG. 10, there is illustrated a block diagram of channel decoder 33. The input terminals thereof bear the same reference numerals as the output terminals of channel counter 31 in FIG. 9 to which they are respectively connected. Of the sixteen illustrated output terminals, only that one is energized which corresponds to the count then in channel counter 31. The output terminals are designated by the number of the channel selected when the associated terminal is energized. Each output terminal is coupled through a cathode follower, such as cathode follower 331 and three gates, such as gates 332, 333 and 334, to four of the input terminals. For example, if channel five is to be selected, this corresponds to a count of decimal five residing in channel counter 31 in binary form. The binary equivalent of five is 0101 and corresponds to the stage 4 complement, stage 3, stage 2 and stage 1 terminals respectively 314, 311, 307 and 305, being high and conditioning gates 333 and 334 whose output lines combine to condition gate 332, thereby raising the potential on the Sel-Chan 5 output terminal through cathode follower 331 to select channel five.

The Advance Inhibit conditioning potential is provided on output terminal 276 through amplifier 335 energized by one of the conditioning potentials from terminals 306, 307, 311 or 313, coupled through buffer 336. At least one of these terminals is high, except when channel counter 31 has a count of one therein. Hence, this is the only time the potential on terminal 276 is low.

8. *DAC Control*

Figure 11:
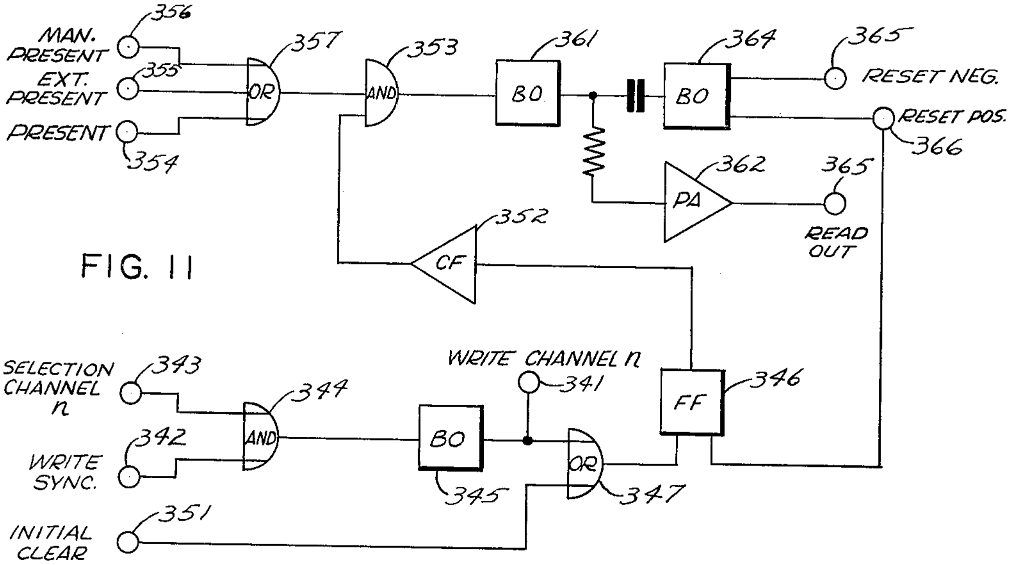
FIG. 11 is a block diagram of the DAC control circuits.

Referring to FIG. 11, there is illustrated a block diagram of apparatus in DAC control 34 associated with each digital-to-analog conversion channel. A Write Channel *n* pulse is generated on terminal 341 in response to a Write Sync pulse being applied to terminal 342 when terminal 343 is energized with the appropriate Select Channel *n* conditioning potential from channel decoder 33. The pulse passed by gate 344 is applied to blocking oscillator 345 to generate the Write Channel *n* pulse which is coupled through buffer 347 to set flip-flop 346. An Initial Clear pulse applied to terminal 351 and coupled through buffer 347 is also effective in setting flip-flop 346. The conditioning potential derived from the latter in the set condition is coupled through cathode follower 352 to condition gate 353 whereby the latter passes a Present, External Present, or Manual Present pulse applied on terminals 354, 355 and 356 through buffer 357 to trigger blocking oscillator 361, thereby providing an output pulse which is amplified by amplifier 362 to provide a Read Out pulse on terminal 363 for causing the associated storage cores in DAC memory units 36 to transfer the stored data bits into the appropriate digital-to-analog converter. The output pulse from blocking oscillator 361 is also used to trigger blocking oscillator 364 to provide Reset Negative and Reset Positive pulses on terminals 365 and 366, respectively, for use in the associated digital-to-analog converter channel, the latter resetting flip-flop 346.

9. *Digital-to-Analog Conversion Stage*

Figure 12:
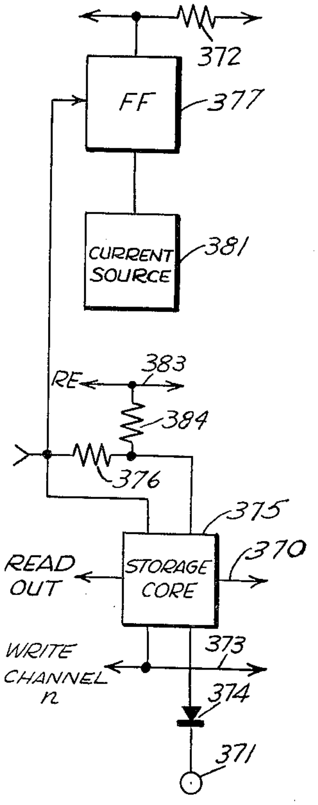
FIG. 12 is a block diagram of a digital-to-analog conversion stage.

Referring to FIG. 12, there is illustrated a block diagram of a typical stage for converting a digital data bit signal into its corresponding analog signal. For each conversion channel there are as many weighted stages as digital data bits, exclusive of the sign bit. Thus, in this example there are seventeen weighted stages.

A data bit signal applied to terminal 371 is converted to a corresponding voltage across resistor 372 which is added to the other voltages derived from bit signals related to digits of greater and lesser significance in the binary number to be converted into analog form. Line 373 is normally low and prevents diode 374 from conducting. However, when a Write Channel *n* conditioning potential is applied thereto, diode 374 is conditioned to conduct when a negative pulse is applied to terminal 371, indicative of the binary digit One, to set storage core 375. The following Read Out pulse, applied to the core on line 370, resets the storage core to provide an output pulse across resistor 376, setting flip-flop 377 and allowing the regulated current from current source 381 to flow therethrough and through resistor 372. Each resistor 372 is then chosen to have a value twice as great as the resistor in the adjacent stage associated with the binary digit of immediately lesser significance, and one-half as great as the resistor in the next stage associated with the digit of immediately greater significance.

If the associated storage core 375 is in the Zero state and flip-flop 377 previously resided in the One state, it must be reset to Zero. This is accomplished by generating a Reset pulse contemporaneously with the Readout pulse. The Reset pulse is applied to line 383 through resistor 384 and insures that flip-flop 377 is in the Zero state. However, this resetting effect is overridden by the output pulse derived across resistor 376 when core 375 is reset to the Zero state from the one state. As a result, the analog voltage corresponding to the last converted digital number is continuously available to the analog computer. Stated in other words, each DAC channel presents and holds between conversions.

10. *Super Regulated Current Source*

Figure 12A:
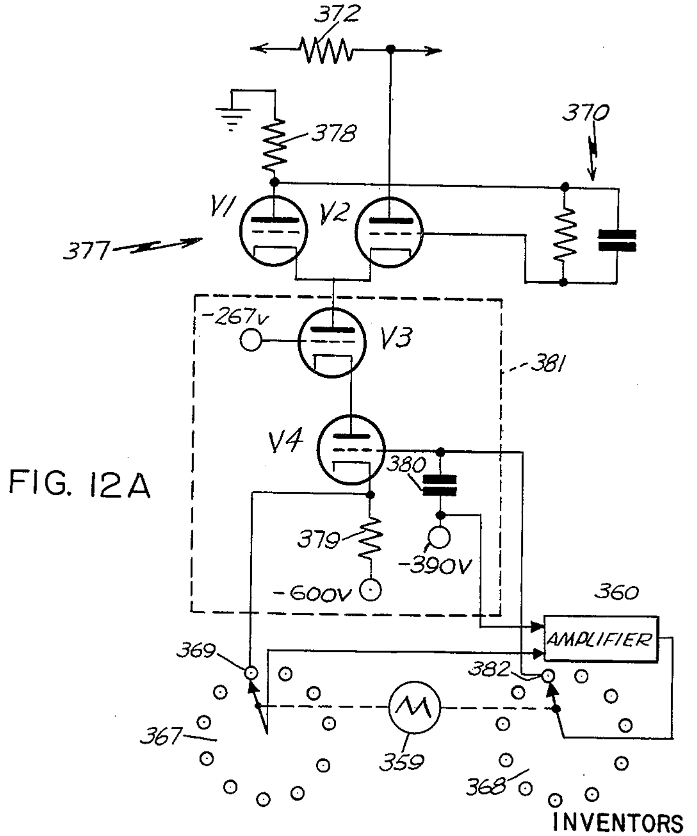
FIG. 12A is a schematic circuit diagram of a super regulated switched current source.

Referring to FIG. 12A, there is shown a schematic circuit diagram of a super regulated current source 381, the flip-flop 377 for selectively directing the regulated current therefrom through resistor 372, and the means for precisely controlling the magnitude of the super regulated current. Super regulation in the stages converting the eleven most significant binary digits into respective analog voltages results in the generation of an analog voltage accurately indicative of the converted binary number. Conventional means of current regulation are employed for current source 381 in the stages converting the six least significant digits.

Tubes V1 and V2 and associated components comprise flip-flop 377. The cathode current of these tubes is drawn through cascoded tubes V3 and V4 which, with associated circuit components, ccomprise a super regulated current source 381. The potential on the cathode of tube V4 is periodically compared with the fixed potential of −390 volts in amplifier 360 and the amplified difference is applied to the grid of tube V4 to alter the current flow therethrough in a direction which corrects this difference. An input and the output of amplifier 360 are sequentially connected to the cathode and grid respectively of tube V4 in each of the stages associated with the respective eleven most significant digits. A motor 359 rotates these ganged switches. A capacitor 380 maintains the corrective potential on the grid of tube V4 between sampling intervals.

The operation of flip-flop 377 is conventional. To indicate the presence of a One, a negative pulse from storage core 375 (FIG. 12) is applied to normally conducting tube V1. Tube V1 is thereby rendered non-conductive. The corresponding rise in potential across resistor 378 is transmitted through coupling network 370 to render tube V2 conductive whereby the super regulated current is directed through resistor 372. When line 383 (FIG. 12) is energized with a Reset pulse, this positive pulse is coupled through resistors 376 and 384 (FIG. 12) to return tube V1 to the conducting state. The corresponding drop in potential across resistor 378 is coupled through coupling network 370 to return tube V2 to the non-conducting state. The super regulated current then flows through resistor 378 instead of resistor 372.

11. *Sign Bit Sensing Stage*

Figure 13:
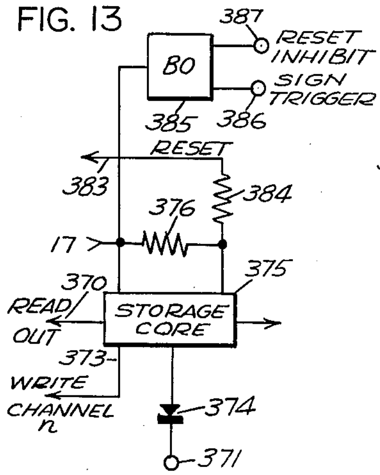
FIG. 13 is a block diagram of the sign bit sensing stage.

Referring to FIG. 13, there is illustrated the stage for deriving an indication of the sign bit. The storage portion and means for deriving a pulse indicative of the stored bit is the same as the apparatus illustrated in FIG. 11; however, the flip-flop and associated current source has been replaced by blocking oscillator 385 which provides Sign Trigger and Reset Inhibit pulses on output terminals 386 and 387, respectively, if the associated core 375 is reset from the One to the Zero state to provide an output pulse across resistor 376 overriding the Reset pulse on line 383. Otherwise, the Reset pulse prevents blocking oscillator 385 from being triggered.

12. *Switched Output Amplifier*

Figure 14:
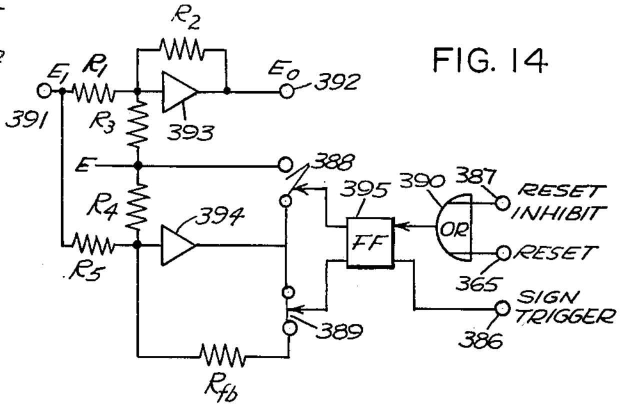
FIG. 14 is a block diagram of a switched output amplifier.

Referring to FIG. 14, there is illustrated a block diagram of a switched output amplifier for imparting the correct polarity to the analog voltage derived across resistors 372 in response to the presence or absence of Sign Trigger and Reset Inhibit pulses on terminals 386 and 387, respectively (FIG. 13). The polarity of the negative voltage derived across the resistors 372 is reversed by a buffer amplifier, and the positive analog voltage is applied to terminal 391. An output voltage, proportional to the magnitude of the positive analog voltage, is reproduced with correct polarity on output terminal 392.

Basically, there are provided two channels between input terminal 391 and output terminal 392. The first includes resistor $R_1$ in series with high gain amplifier 393 shunted by a feedback resistor $R_2$. This path is always active. The second channel consists of resistor $R_5$, amplifier 394 shunted by resistor $R_4$, resistor $R_3$ and amplifier 393 shunted by resistor $R_2$. This path is active only when switches 388 and 289 are respectively opened and closed as illustrated, the voltage E at the junction of resistors $R_3$ and $R_4$ remains zero regardless of the input voltage $E_i$. It, therefore, has no effect on the input to amplifier 393, and consequently, the output voltage $E_o$. The amplifiers 393 and 394, which are identical in principle of operation, are conventional phase inverting, chopper-stabilized D.C. amplifiers. The stability of their outputs is effected by a degenerative feedback technique in which the resistors $R_1$–$R_5$ completely determine the net gain through the respective channels. Operational amplifiers of this general type are described in chapter V of Electronic Analog Computers by Korn and Korn.

By applying the principles of superposition, the output voltage $E_o$ upon terminal 392 is $$E_o=E_i(K_1)-E(K_2)$$

where $K_1=R_2/R_1$ and $K_2=R_2/R_3$.

With switch 388 closed and switch 389 open, the voltage E is the output voltage of amplifier 394 and is given by $$E=-E_i(K_3) \text{ where } K_3=R_4/R_5$$

By substituting the latter equation in the former, the conditions for the relation of the various gains may be determined to obtain the desired operation. It is to be noted that with switch 388 open and switch 389 closed, the feedback path through resistor $R_{fb}$ is effective in maintaining the potential at the input of amplifier 394 substantially zero. Consequently the potential at the junction of resistors $R_3$ and $R_4$ is zero, regardless of the value of $E_i$. Thus, in this condition the output voltage $E_o$ is merely $-K_1E_i$. When switches 388 and 389 are respectively closed and opened, it is desired that the magnitude of the output voltage $E_o$ be the same, but with reversed polarity. The voltage E is then non-zero and when multiplied by the gain $K_2$ must override the term $E_i(K_1)$ by exactly the magnitude of the latter. Accordingly, the conditions for this to occur are that $2K_1=K_2K_3$. Typical values of the resistances $R_1$ to $R_5$ which fulfill this condition are: $R_1$ and $R_5$ 100,000 ohms; $R_2$, 50,000 ohms; $R_3$, 20,000 ohms; and $R_4$ 40,000 ohms.

Switches 388 and 389 are diagrammatically represented as ordinary single-pole single-throw switches. Preferably, these are electronic switches which are set in the desired condition in accordance with the state of flip-flop 395. When it is desired to provide a negative output voltage, flip-flop 395 is set by a Sign Trigger pulse applied on terminal 386 as the Reset Inhibit pulse on terminal 387 overrides the effect of the Reset pulse on terminal 365. This effectively removes the second channel from the circuit. However, when it is desired to provide a positive output signal, the second path is switched in as flip-flop 395 is reset by a Reset pulse applied to terminal 365 through buffer 390. Although the Sign Trigger Pulse, Reset Inhibit and Reset pulses are coincident, the former two, when present to indicate the converted binary number is negative, override the resetting effect of the latter.

13. *ADC Programmer*

The process of converting analog data signals to digital data signals may be formed in a manner somewhat similar to that of converting digital numbers to analog voltages in that current switches and an absolute value, or sign amplifier, may be employed for this operation. The preferred embodiment of the invention takes advantage of these techniques. However, instead of reading out the voltage produced by the current switches, the state of the current switch plates which produce a given analog voltage is sensed; that is, a digitized number is derived representative of an analog voltage. In addition, a sign bit characteristic of the polarity is determined. The digital number is ascertained by means of a serial operation; that is, one bit at a time is processed in accordance with pulses supplied from ADC programmer 40. Basically, the programmer performs the following functions: First, it generates a Star Sequence pulse, hereinafter designated SS pulse. In response to the SS pulse, an SS′ pulse, whose function is discussed below, is generated. Secondly, the programmer starts a timing generator sequence wherein after an initial interval of 12 microseconds following the generation of the SS pulse, a digit setting pulse is generated for setting the current switch associated with the most significant digit in the appropriate state. This pulse is reproduced in opposite polarity as are all subsequently provided digit setting pulses associated with digits of lesser significance in the binary number corresponding to the input analog voltage then being sampled. Each of these pulses is hereinafter designated $D_n$ wherein $n$ identifies the significance of the associated binary digit. Coincident with each D pulse, the programmer generates a Common Decision or interrogation pulse, hereinafter referred to as a CD pulse, to a comparator, discussed below, which compares the input analog voltage less the analog voltage corresponding to those binary digits already selected as One with the analog voltage corresponding to the binary digit One in the digit place it is then desired to determine.

Figure 15:
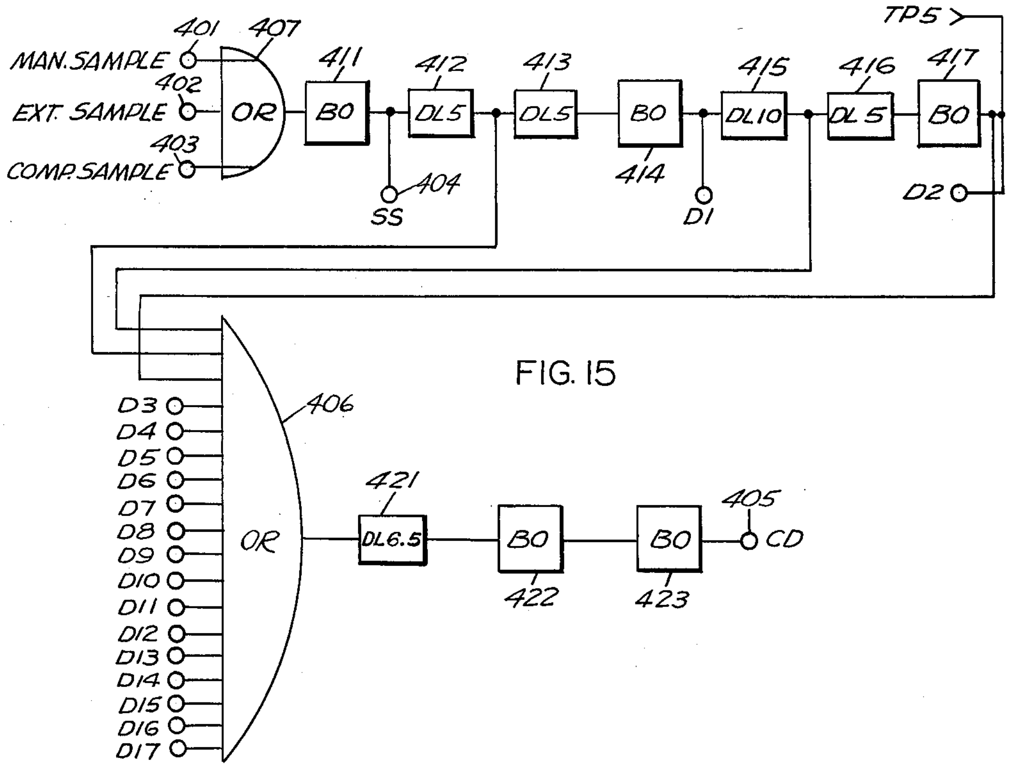
FIG. 15 is a block diagram of the ADC programmer.

Referring to FIG. 15, there is illustrated a block diagram of the ADC programmer. In response to a Manual Sample, External Sample or Computer Sample pulse applied on terminals 401, 402 and 403, respectively, an SS pulse is provided on terminal 404, sequentially spaced digit pulses on terminals $D_1$–$D_{17}$ respectively, and a CD pulse on output terminal 405 is provided in response to each pulse applied to buffer 406. A Sample pulse coupled through buffer 407 triggers blocking oscillator 411 to provide the SS pulse on terminal 404. This pulse is delayed by delay line 412 for five microseconds and its output applied to buffer 406 and to delay line 413 where an additional seven microsecond delay is imparted thereto before blocking oscillator 414 is triggered to provide the $D_1$ pulse. The latter pulse is delayed 10 microseconds by delay line 415 and applied to an input of buffer 406 and to delay line 416 where an additional seven microsecond delay is imparted before triggering blocking oscillator 417 to provide a digit pulse $D_2$ which is applied as an input to buffer 406. The subsequent digit pulse terminals $D_3$–$D_{17}$ are electrically separated by a seven microsecond delay line like delay line 416 in series with a blocking oscillator like blocking oscillator 417. Accordingly, it is unnecessary to specifically show the remaining stages.

The output of buffer 406 is delayed 6.5 microseconds by delay line 421 before triggering blocking oscillator 422 which in turn triggers blocking oscillator 423 to provide the CD pulse on terminal 405, thereby providing a CD pulse at the appropriate time for determining each digit of the binary number in proper sequence. As indicated above, the ADC apparatus compares the input analog signal with an internally generated analog signal corresponding to respective digits of a binary number being One. The analog signal from analog computer 12 (FIG. 1) is applied to terminal 391 of an amplifier like the switched output amplifier shown in FIG. 14. This provides on terminal 392 an analog signal which is always positive. This is accomplished in a manner to be described below.

14. *ADC Comparator*

Figure 16:
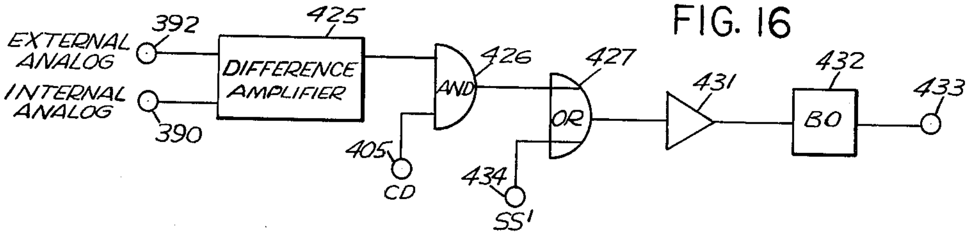
FIG. 16 is a block diagram of the ADC comparator.

With reference to FIG. 16, there is illustrated a block diagram of the ADC comparator for comparing such voltages. The initial step in the program of converting the analog voltage to its digital equivalent involves determining the sign bit. To this end, the External Analog signal from terminal 392 (FIG. 14) controls the polarity of the output signal from comparison amplifier 425 since, at this time, each current switching flip-flop is in the Zero state and the Internal Analog voltage supplied therefrom is zero. Gate 426 is conditioned to pass CD pulses applied on terminal 405 when the output from comparison amplifier 425 is negative. This pulse is coupled through buffer 427 and amplifier 431 to trigger blocking oscillator 432 and provide an Internal Decision pulse, hereinafter designated DP pulse, on terminal 433 which is applied to terminal 386 (FIG. 14), thereby setting flip-flop 395 so that the output voltage from terminal 392 then becomes positive. In other words, the switched output amplifier must always provide a positive voltage for comparison with the internally generated analog voltage. A DP pulse is also derived on terminal 433 in response to an SS′ pulse applied on terminal 434.

Figure 17:
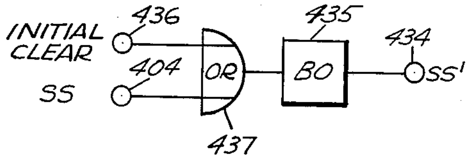
FIG. 17 is a block diagram of the means for driving a pulse utilized in the ADC comparator.

With reference to FIG. 17, there is shown a block diagram of the means for deriving the SS′ pulse on terminal 434. This is derived by triggering blocking oscillator 435 with an Initial Clear or SS pulse applied on terminals 436 and 404, respectively, through buffer 437.

Figure 18:
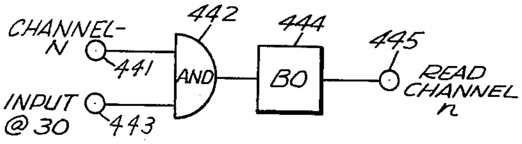
FIG. 18 is a block diagram of apparatus for providing a channel selecting pulse during a read operation.

Referring to FIG. 18, there is illustrated a block diagram of apparatus for providing a Read Channel *n* pulse for reading out the digital number in the selected analog-to-digital conversion channel. There is like apparatus for each of the fifteen channels. When a respective channel is conditioned as a result of the appropirate output line in output cable 52 from channel decoder 33 being energized, terminal 441 is raised, conditioning gate 442 to permit the latter to pass an Input pulse applied to terminal 443 to trigger blocking oscillator 444 and provide the Read Channel *n* pulse on terminal 445.

15. *Analog-to-Digital Conversion Stage*

Figure 19:
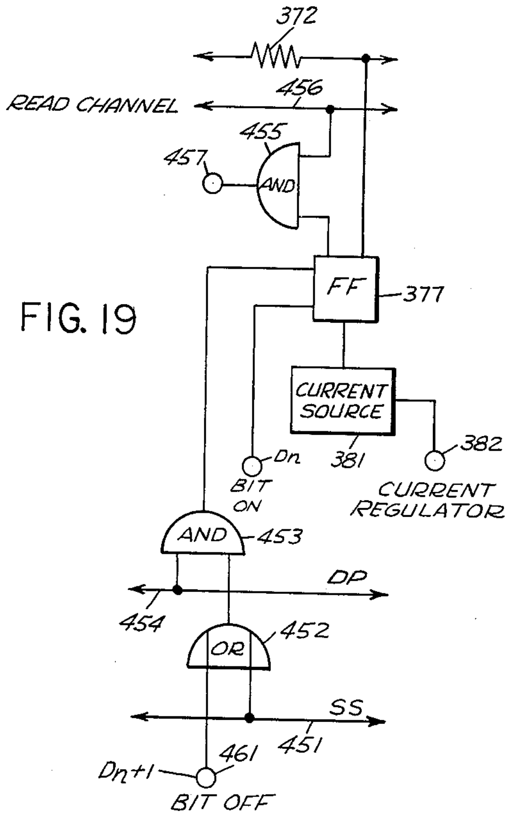
FIG. 19 is a block diagram of an analog-to-digital conversion stage.

Referring to FIG. 19, there is illustrated a typical stage for internally generating an analog voltage corresponding to the associated binary digit being One. Like the digital-to-analog conversion stage illustrated in FIG. 12, there is a current source 381, a current switching flip-flop 377, and the regulated current flows through a resistor 372 to provide the internally generated output analog voltage when the flip-flop 377 is set in the One condition. Prior to each conversion, the flip-flop 377 is reset to the Zero state because there is simultaneously generated an SS pulse on line 451 which is coupled through buffer 452 to gate 453 and a DP on line 454 generated in response to an SS′ pulse. (See FIGS. 16 and 17.)

A comparison to determine the value of the *n*'th bit is initiated with the generation of the $D_n$ pulse applied to the designated terminal, setting flip-flop 377 and permitting current to flow from current source 381 through resistor 372 to produce an internally generated analog voltage corresponding to the digit of *n*'th significance being One. This Internal Analog voltage is applied to terminal 390 of difference amplifier 425 (FIG. 16) for comparison with the External Analog voltage applied on terminal 392. If the latter voltage is larger, it signifies that the *n*'th digit of the binary number characteristic of the External Analog voltage is One and the output of comparison amplifier 425 is positive, thereby preventing gate 426 from passing a CD pulse and no DP pulse is generated on terminal 433. Flip-flop 377 remains set, thereby conditioning gate 455. Thus conditioned, a Read Channel *n* pulse, applied on line 456, is passed to provide an output pulse on terminal 457 indicating that *n*'th binary digit is One. However, if the result of this comparison indicates that the internally generated signal is of greater magnitude, the output of comparison amplifier 425 is negative, gate 426 is conditioned and a DP pulse is provided on terminal 433. This pulse and the $D_n+1$ pulse occur simultaneously. The $D_n+1$ pulse is applied on terminal 461 and coupled through buffer 452 to gate 453. Since the $D_n+1$ and DP pulses occur simultaneously, an output pulse is provided from gate 453 for resetting flip-flop 377 to the Zero state. With flip-flop 377 in the Zero state, gate 455 is deconditioned.

Thus, when the Read Channel *n* pulse occurs, it is not transferred through gate 455 to output terminal 457. This signifies that the digit of *n*'th significance in the binary number representative of the Input Analog voltage is zero. In this manner, each digit in all channels is determined in sequence. In response to the Read Channel *n* pulse, all the digits of the representative binary number are simultaneously transferred through the line drivers 38 and terminal equipment to the digital computer IOB register 11 (FIG. 12) in the manner described above.

By referring to FIG. 16, it is seen that a Read Channel *n* pulse is derived in response to the arrival of an Input pulse on terminal 443 so that all the switches of the selected channel are simultaneously read out. Additionally, a gate may be energized by each of the output terminals 457 so that when all seventeen bits are Ones the output pulse from this gate indicates overflow which may be utilized to activate an alarm.

There has thus been described apparatus for rapidly interchanging digital and analog data signals between digital and analog computers under the control of the former and compatible therewith. While the best mode now contemplated for practicing the invention has been described, it is by way of example only. It is apparent that those skilled in the art may make numerous modifications of and departures from the specific analog-to-digital converters, digital-to-analog converters, and other apparatus described herein while remaining within the inventive concepts. Consequently, the invention is to be construed as limited only by the spirit and scope of the appended claims.

What is claimed is:

1. Apparatus for linking digital and analog computers comprising, terminal means for accepting and interpreting input digital data signals representative of binary numbers, each including a sign bit indicative of sense and digit bits indicative of magnitude, a plurality of digital-to-analog conversion channels for converting into analog form interpreted digital data signals provided by said terminal means in response to digital data signals from said digital computer, each of said digital-to-analog conversion channels including means responsive to the value of said sign bit and said data bits for controlling the polarity and magnitude, respectively, of a converted signal in analog form and presenting the most recent converted signal to said analog computer, a plurality of analog-to-digital conversion channels for converting analog signals supplied from said analog computer into digital form, each of said analog-to-digital conversion channels including means responsive to the polarity of a respective input analog signal for providing an absolute analog signal always of the same polarity with magnitude proportional to that of said respective input analog signal and means responsive to said absolute analog signal for binarily encoding its magnitude, means responsive to the internal program of said digital computer for developing control signals, and means responsive to said control signals for selectively activating said digital-to-analog conversion channels, simultaneously activating all said analog-to-digital conversion channels, and selectively transmitting said converted signals in digital form through said terminal means to said digital computer.

2. Apparatus for linking digital and analog computers comprising, terminal means for accepting digital data signals representative of numbers, a plurality of digital-to-analog conversion channels for converting into analog form digital data signals coupled from said digital computer through said terminal means, each digital-to-analog conversion channel presenting its most recent converted signal to said analog computer, a plurality of analog-to-digital conversion channels for converting into analog form signals coupled from said analog computer, means responsive to the digital computer internal program for selectively providing write signals, present signals, sample signals, read signals and address signals, means responsive to said write signals for transferring digital data signals to said digital-to-analog conversion channels through said terminal means from said computer, means responsive to said present, said address and said transferred digital data signals for converting the number represented by said transferred digital data signals into analog form in the digital-to-analog conversion channel then designated by said address signals, means responsive to said sample signals for simultaneously converting the analog signals in all said channels to digital form, and means responsive to said read signals and said address signals for coupling the converted signal in digital form through said terminal means to said digital computer from the analog-to-digital conversion channel then designated by said address signals.

3. Apparatus in accordance with claim 2 wherein said digital computer provides select signals when digital data signals are to be transferred between said digital computer and external equipment, and additionally provides master bit signals when said external equipment includes said computer linking apparatus, and further comprising, means responsive to said master bit signals for activating said computer linking apparatus to exchange digital data signals with said digital computer, and means responsive to said select signals when said master bit signals are absent for preventing said computer linking apparatus from responding to instruction and digital data signals from said digital computer.

4. Apparatus in accordance with claim 3 wherein said digital data signals include a sign bit signal and magnitude bit signals characteristic of the sense and magnitude, respectively, of the number represented and said terminal means comprises, a complementer, write gates conditioned by said write signals to pass said digital data signals with said magnitude bit signals energizing said complementer, said complementer providing said magnitude bit signals complemented and not complemented in response to said sign bit signal then being first and second values, respectively, to said digital-to-analog conversion channels, and read gates conditioned by said read signals to pass said converted signal in digital form with magnitude bit signals thereof energizing said complementer, said complementer providing the latter magnitude bit signals complemented and not complemented in response to the accompanying sign bit signal then being said first and said second values, respectively, to said digital computer.

5. Apparatus in accordance with claim 3 and further comprising, means for sequentially selecting consecutively arranged channels for transferring converted data signals between said digital and analog computers.

6. Apparatus for effecting the transfer of information between an analog computer and a digital computer, the digital computer being of the type employing a binary code in which positive numbers are absolute values and negative numbers are represented by complements and the binary code includes a sign bit indicating whether a complement is represented by a code word, the apparatus comprising:

an instruction register for determining the direction of information transfer between the computers;
a complementer for supplying the complement of negative numbers;
write gates controlled by the instruction register, the write gates being adapted to connect the parallel output of the digital computer to the complementer;
a complementer control, the complementer control in response to a sign bit indicative of a complement causing the complementer to produce the complement of the encoded binary number applied to its input;
means coupling to the complementer control the sign bit in the output of the digital computer;
a digital-to-analog converter having its output coupled to the analog computer;
a memory device receiving its input from the complementer and having its output coupled to the digital-to-analog converter;
an analog-to-digital converter deriving its input from the analog computer;
means controlled by the instruction register for causing the output of the analog-to-digital converter to be applied to the input of the complementer;
means applying the sign bit in the output of the analog-to-digital converter to the complementer control;
and read gates controlled by the instruction register for coupling the output of the complementer to the digital computer.

7. Apparatus for effecting the transfer of information between an analog computer and a digital computer, the digital computer being of the type employing a binary code in which positive numbers are absolute values and negative numbers are represented by complements and the binary code includes a sign bit indicating whether a complement is represented by a code word, the apparatus comprising:

an instruction register for determining the direction of information transfer between the computers;
a complementer for supplying the complement of negative numbers;
write gates controlled by the instruction register, the write gates being adapted to connect the parallel output of the digital computer to the complementer;
a complementer control, the complementer control in response to a sign bit indicative of a complement causing the complementer to produce the complement of the encoded binary number applied to its input;
means coupling to the complementer control the sign bit in the output of the digital computer;
a plurality of digital to analog converters;
a plurality of memory units, each unit having its output coupled to a different one of the digital-to-analog converters;

means controlled by the instruction register for connecting the output of a selected one of the digital-to-analog converters to the analog computer;

a plurality of analog-to-digital converters, each of the analog-to-digital converters deriving its input from the analog computer;

means controlled by the instruction register for causing the output of a selected one of the analog-to-digital converters to be applied to the input of the complementer;

means applying the sign bit in the output of the selected analog-to-digital converter to the complementer control;

and read gates controlled by the instruction register for coupling the output of the complementer to the digital computer.

References Cited in the file of this patent

UNITED STATES PATENTS

| | | |
|---|---|---|
| 2,685,084 | Lippel et al. | July 27, 1954 |
| 2,718,634 | Hansen | Sept. 20, 1955 |
| 2,836,356 | Forrest et al. | May 27, 1958 |
| 2,865,564 | Kaiser et al. | Dec. 23, 1958 |

OTHER REFERENCES

Palevsky: Hybrid Analog, Digital Computing Systems, Instruments & Automation (October 1957), pp. 1877–80, v. 30.